US012631008B2

(12) United States Patent
Wuisan et al.

(10) Patent No.: US 12,631,008 B2
(45) Date of Patent: May 19, 2026

(54) CONTAINER LOAD ASSIST SYSTEM AND METHOD FOR A WORK VEHICLE

(71) Applicant: DEERE & COMPANY, Moline, IL (US)

(72) Inventors: Giovanni A. Wuisan, Epworth, IA (US); Scott J. Breiner, Dubuque, IA (US); Kevin W. Campbell, Strathroy (CA); Kurt A. Chipperfield, Dubuque, IA (US); Michael G. Kean, Maquoketa, IA (US); Nathaniel M. Czarnecki, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 31 days.

(21) Appl. No.: 18/593,083

(22) Filed: Mar. 1, 2024

(65) Prior Publication Data

US 2024/0200308 A1 Jun. 20, 2024

Related U.S. Application Data

(63) Continuation of application No. 17/082,833, filed on Oct. 28, 2020, now Pat. No. 11,946,230.

(51) Int. Cl.
*E02F 9/26* (2006.01)
*E02F 3/43* (2006.01)
(Continued)

(52) U.S. Cl.
CPC .............. *E02F 9/262* (2013.01); *E02F 3/434* (2013.01); *E02F 9/2041* (2013.01); *E02F 9/2253* (2013.01); *B60W 2300/17* (2013.01)

(58) Field of Classification Search
None
See application file for complete search history.

(56) References Cited

U.S. PATENT DOCUMENTS 4,981,186 A 1/1991 Shankle et al.
5,890,770 A 4/1999 Palmberg, Jr.
(Continued)

FOREIGN PATENT DOCUMENTS

CN 102285592 A 12/2011
DE 102019216781 A1 4/2020
(Continued)

OTHER PUBLICATIONS

Built Robotics, "Built Robotics Robots that Build the World," <https://www.youtube.com/watch?v=7KuUnYj5XGQ> YouTube video accessed Jun. 22, 2020.
(Continued)

*Primary Examiner* — Christian Chace
*Assistant Examiner* — Scott R Jagolinzer
(74) *Attorney, Agent, or Firm* — Michael Best & Friedrich LLP

(57) ABSTRACT

A system includes a work vehicle, user interface, and controller. The work vehicle includes a frame, boom, implement, perception sensor, and ground speed sensor. The perception sensor senses an approaching environment. The user interface includes controls and indicators. The controller is coupled to the controls, indicators, perception sensor, and ground speed sensor. The controller receives a command to move the work vehicle, drives the work vehicle, determines a distance to the container, determines the ground speed, determines a boom raising start distance from the container, receives a command to raise the boom, and activates one of the indicators if the user command to raise the boom occurs prior to the work vehicle reaching the boom raising start distance from the container.

9 Claims, 32 Drawing Sheets

(51) Int. Cl.
    *E02F 9/20*       (2006.01)
    *E02F 9/22*       (2006.01)

(56)          References Cited

U.S. PATENT DOCUMENTS

| | | | | |
|---|---|---|---|---|
| 6,157,889 | A | 12/2000 | Baker | |
| 8,386,134 | B2 | 2/2013 | Morey et al. | |
| 9,605,959 | B2 | 3/2017 | Bando et al. | |
| 9,868,623 | B1 | 1/2018 | Guy | |
| 9,932,993 | B2 | 4/2018 | Zhang et al. | |
| 10,570,582 | B2 | 2/2020 | Berry et al. | |
| 10,876,270 | B2* | 12/2020 | Imaizumi | E02F 9/0841 |
| 2010/0084908 | A1 | 4/2010 | Montocchio | |
| 2012/0290178 | A1 | 11/2012 | Suzuki et al. | |
| 2012/0293316 | A1* | 11/2012 | Johnson | E02F 9/2087 |
| | | | | 340/438 |
| 2014/0248589 | A1 | 9/2014 | Swiderski et al. | |
| 2014/0330490 | A1 | 11/2014 | Aoki et al. | |
| 2015/0006010 | A1 | 1/2015 | Ito | |
| 2015/0276415 | A1 | 10/2015 | Shrinath et al. | |
| 2015/0308070 | A1 | 10/2015 | Deines | |
| 2016/0076225 | A1* | 3/2016 | Atkinson | G01S 13/931 |
| | | | | 701/50 |
| 2017/0219453 | A1 | 8/2017 | Landes et al. | |
| 2018/0080193 | A1 | 3/2018 | Myers | |
| 2018/0087240 | A1 | 3/2018 | Schmitt et al. | |
| 2018/0142441 | A1 | 5/2018 | Berry et al. | |
| 2018/0179732 | A1 | 6/2018 | Bartsch et al. | |
| 2018/0229428 | A1 | 8/2018 | Takano | |
| 2019/0093311 | A1* | 3/2019 | Naito | B60Q 9/008 |
| 2019/0100899 | A1* | 4/2019 | Kimura | E02F 9/22 |
| 2020/0018037 | A1 | 1/2020 | Nakamura et al. | |
| 2020/0299923 | A1 | 9/2020 | Enomoto et al. | |
| 2020/0308803 | A1* | 10/2020 | Singh | E02F 3/434 |
| 2020/0362530 | A1* | 11/2020 | Seki | E02F 3/431 |
| 2021/0017737 | A1 | 1/2021 | Schwartz et al. | |
| 2021/0148083 | A1 | 5/2021 | Taylor et al. | |
| 2021/0188147 | A1 | 6/2021 | De Jager et al. | |
| 2021/0232137 | A1 | 7/2021 | Whitfield, Jr. et al. | |
| 2021/0355657 | A1* | 11/2021 | Hyodo | E02F 9/202 |

FOREIGN PATENT DOCUMENTS

| | | | |
|---|---|---|---|
| EP | 3342942 | A1 | 7/2018 |
| EP | 3412837 | A1 | 12/2018 |
| EP | 3412838 | A1 | 12/2018 |
| JP | H11189315 | A | 7/1999 |
| JP | 5874365 | B2 | 3/2016 |
| WO | 2019207981 | A1 | 10/2019 |

OTHER PUBLICATIONS

Equipment Today, "Volvo Prototype Autonomous Truck and Wheel Loader Demonstration," <https://www.youtube.com/watch?v=ItpGXew7zLc> YouTube video accessed Jun. 22, 2020.

FX Budi Santosa, "Doosan Concept-X," <https://www.youtube.com/watch?v=XafK5gyOb8A> YouTube video accessed Jun. 22, 2020.

Intel Realsense, "Designing Navigation on a Real-life Robot: Lessons Learned," <https://www.youtube.com/watch?v=DVkvzitCNSg> YouTube video accessed Jun. 22, 2020.

Komatsu Construction, "Komatsu WA900-8 Work Equipment Controls," <https://www.youtube.com/watch?V=TUkz5WVXIZg> YouTube video accessed May 7, 2020.

Luis Yoichi Morales, "Fully Autonomous Wheel Loader," <https://www.youtube.com/watch?v=jns25rG4kbQ> YouTube video accessed Jun. 22, 2020.

Sandvik Mining and Rock Technology, "AutoMine Loading—Fully Autonomous Loading Cycle," <https://www.youtube.com/watch?v=1uvytAHinGI> YouTube video accessed Jun. 22, 2020.

The QMJ Group Ltd., "Loading Made Simple with Aggregate Autodig," Quarry Management, Aug. 2005, pp. 21-22.

Zeppelin Baumaschinen, "AutoDig für Radlader," <https://www.youtube.com/watch?v=ODsCpVdMaOA> YouTube video accessed May 7, 2020.

Machine translation of Suzuki (JPH11189315), 1999 (Year: 1999).

Machine translation of Lu (CN102285592), 2011 (Year: 2011).

Machine translation of Nagai (JP5874365B2), 2016 (Year: 2016).

German Search Report issued in application No. DE102021210562.9 dated Jul. 6, 2022 (10 pages).

\* cited by examiner

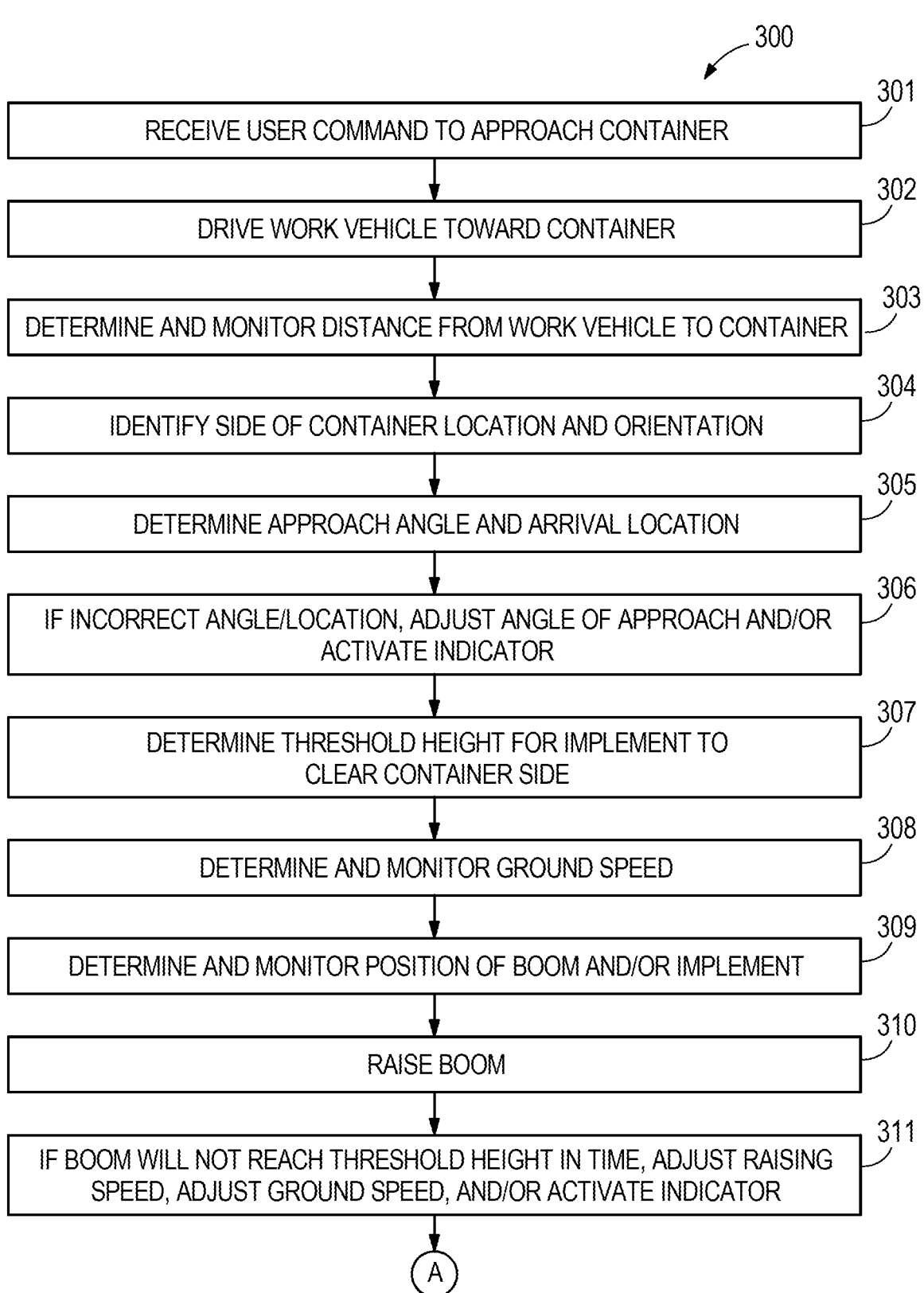

300

301
RECEIVE USER COMMAND TO APPROACH CONTAINER

302
DRIVE WORK VEHICLE TOWARD CONTAINER

303
DETERMINE AND MONITOR DISTANCE FROM WORK VEHICLE TO CONTAINER

304
IDENTIFY SIDE OF CONTAINER LOCATION AND ORIENTATION

305
DETERMINE APPROACH ANGLE AND ARRIVAL LOCATION

306
IF INCORRECT ANGLE/LOCATION, ADJUST ANGLE OF APPROACH AND/OR ACTIVATE INDICATOR

307
DETERMINE THRESHOLD HEIGHT FOR IMPLEMENT TO CLEAR CONTAINER SIDE

308
DETERMINE AND MONITOR GROUND SPEED

309
DETERMINE AND MONITOR POSITION OF BOOM AND/OR IMPLEMENT

310
RAISE BOOM

311
IF BOOM WILL NOT REACH THRESHOLD HEIGHT IN TIME, ADJUST RAISING SPEED, ADJUST GROUND SPEED, AND/OR ACTIVATE INDICATOR

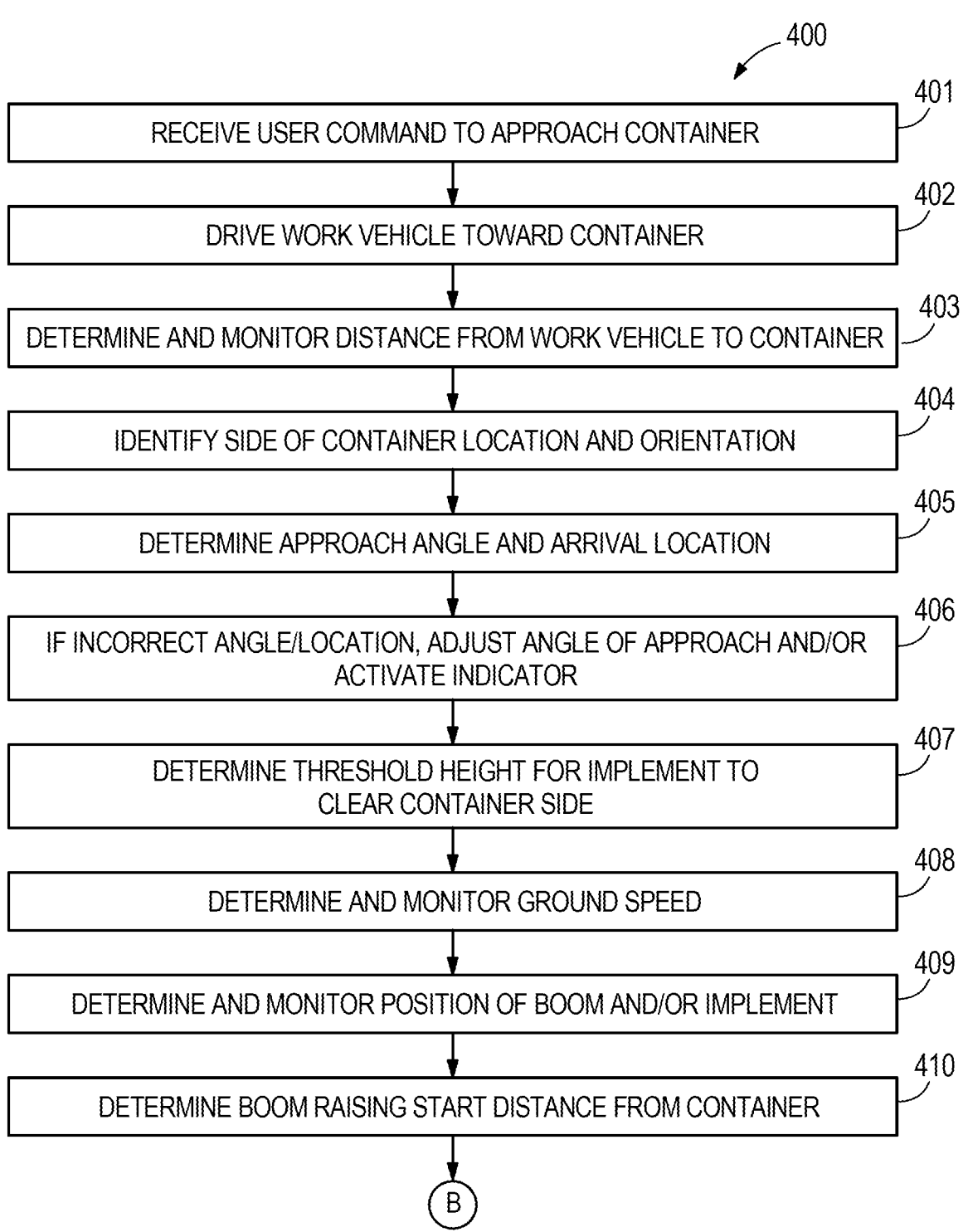

400

401
RECEIVE USER COMMAND TO APPROACH CONTAINER

402
DRIVE WORK VEHICLE TOWARD CONTAINER

403
DETERMINE AND MONITOR DISTANCE FROM WORK VEHICLE TO CONTAINER

404
IDENTIFY SIDE OF CONTAINER LOCATION AND ORIENTATION

405
DETERMINE APPROACH ANGLE AND ARRIVAL LOCATION

406
IF INCORRECT ANGLE/LOCATION, ADJUST ANGLE OF APPROACH AND/OR
ACTIVATE INDICATOR

407
DETERMINE THRESHOLD HEIGHT FOR IMPLEMENT TO
CLEAR CONTAINER SIDE

408
DETERMINE AND MONITOR GROUND SPEED

409
DETERMINE AND MONITOR POSITION OF BOOM AND/OR IMPLEMENT

410
DETERMINE BOOM RAISING START DISTANCE FROM CONTAINER

CONTAINER LOAD ASSIST SYSTEM AND METHOD FOR A WORK VEHICLE

CROSS REFERENCE TO RELATED APPLICATIONS

This application is a continuation of U.S. patent application Ser. No. 17/082,833, filed Oct. 28, 2020, the entire contents of which is incorporated herein by reference.

FIELD

Embodiments described herein relate to operation and control of a work vehicle. More particularly, the embodiments described herein relate to a container load assist system and method for a work vehicle.

SUMMARY

One of the most difficult operations for loader operators to perform is the act of loading a dump truck, hopper, or other container. The operation requires the operator to synchronize forward motion of the loader with raising the boom of the loader, all while ensuring the load carried by the loader is not dropped. This operation can be particularly difficult when carrying aggregate in a bucket attached to the boom, for instance. An operator may misjudge the distance between the loader and the truck and/or may misjudge the required boom height to clear the side of the container. Novice operators in particular tend to perform this operation much slower than expert operators. Even expert operators, however, may not perform this operation as quickly and efficiently as possible.

To address at least some of the above concerns, embodiments described herein provide work vehicles, systems, and methods for assisting an operator in performing a container approach and load operation.

The present disclosure includes a system for operating a work vehicle to load a container. The system includes a work vehicle, a user interface, and a controller. The work vehicle includes a frame, a boom, an implement, at least one perception sensor, and at least one ground speed sensor. The boom has a proximal end coupled to the frame and a distal end opposite the proximal end. The implement is coupled to the distal end of the boom. The perception sensor senses an approaching environment during travel of the work vehicle. The ground speed sensor senses a condition related to a ground speed of the work vehicle. The user interface includes controls and indicators. The controls command at least some operations of the work vehicle. The indicators indicate at least one status related to the work vehicle. The controller is operatively coupled to the controls, the indicators, the perception sensor, and the ground speed sensor. The controller receives a user command via the controls to move the work vehicle toward the container, drives the work vehicle toward the container, determines a distance between the work vehicle and the container, determines the ground speed of the work vehicle, determines a boom raising start distance between the work vehicle and the container, receives a user command via the controls to raise the boom, and activates the indicator if the user command to raise the boom occurs prior to the work vehicle reaching the boom raising start distance from the container.

The present disclosure includes a system for operating a work vehicle to load a container. The system includes a work vehicle, a user interface, and a controller. The work vehicle includes a frame, a boom, an implement, at least one perception sensor, and at least one ground speed sensor. The boom has a proximal end coupled to the frame and a distal end opposite the proximal end. The implement is coupled to the distal end of the boom. The perception sensor senses an approaching environment during travel of the work vehicle. The ground speed sensor senses a condition related to a ground speed of the work vehicle. The user interface includes controls and indicators. The controls command at least some operations of the work vehicle. The indicators indicate at least one status related to the work vehicle. The controller receives a user command via the controls to move the work vehicle toward the container, drives the work vehicle toward the container, determines a distance between the work vehicle and the container, determines the ground speed of the work vehicle, determines a boom raising start distance between the work vehicle and the container, and activates the indicator after the work vehicle has reached the boom raising start distance from the container.

The present disclosure includes a system for operating a work vehicle to load a container. The system includes a work vehicle, a user interface, and a controller. The work vehicle includes a frame, a boom, an implement, at least one perception sensor, and at least one ground speed sensor. The boom has a proximal end coupled to the frame and a distal end opposite the proximal end. The implement is coupled to the distal end of the boom. The perception sensor senses an approaching environment during travel of the work vehicle. The ground speed sensor senses a condition related to a ground speed of the work vehicle. The user interface includes controls and indicators. The controls command at least some operations of the work vehicle. The indicators indicate at least one status related to the work vehicle. The controller is operatively coupled to the controls, the indicators, the perception sensor, and the ground speed sensor. The controller receives a user command via the controls to move the work vehicle toward the container, drives the work vehicle toward the container, determines a distance between the work vehicle and the container, determines the ground speed of the work vehicle, determines a boom raising start distance between the work vehicle and the container, and automatically raises the boom while the work vehicle travels toward the container and after the work vehicle has reached the boom raising start distance from the container.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 3A illustrates a method of operating a work vehicle, according to embodiments described herein.

4

Figure 22:
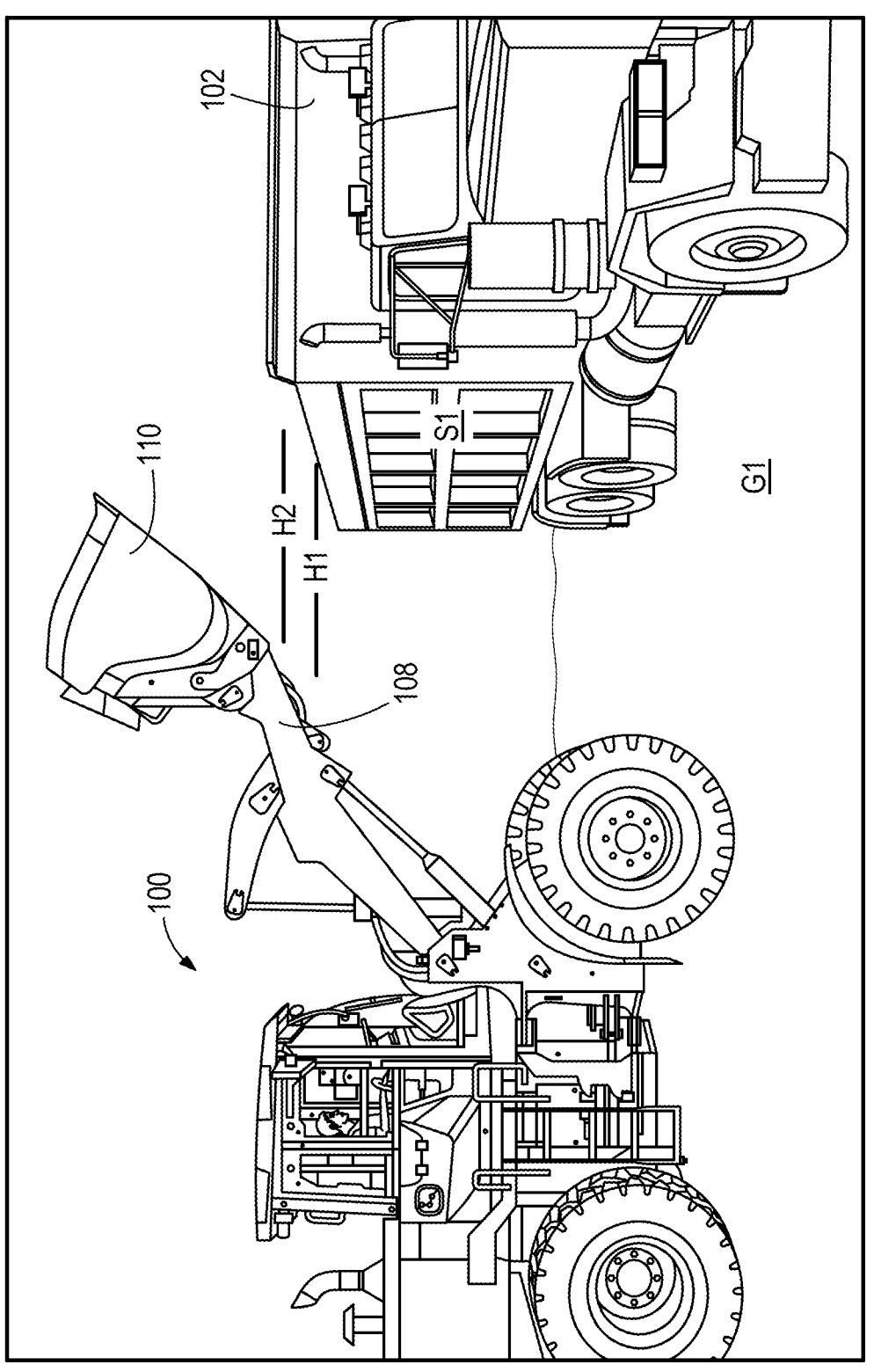
FIG. 22 illustrates a side elevation view of the work vehicle in a fourth position.
Figure 23:
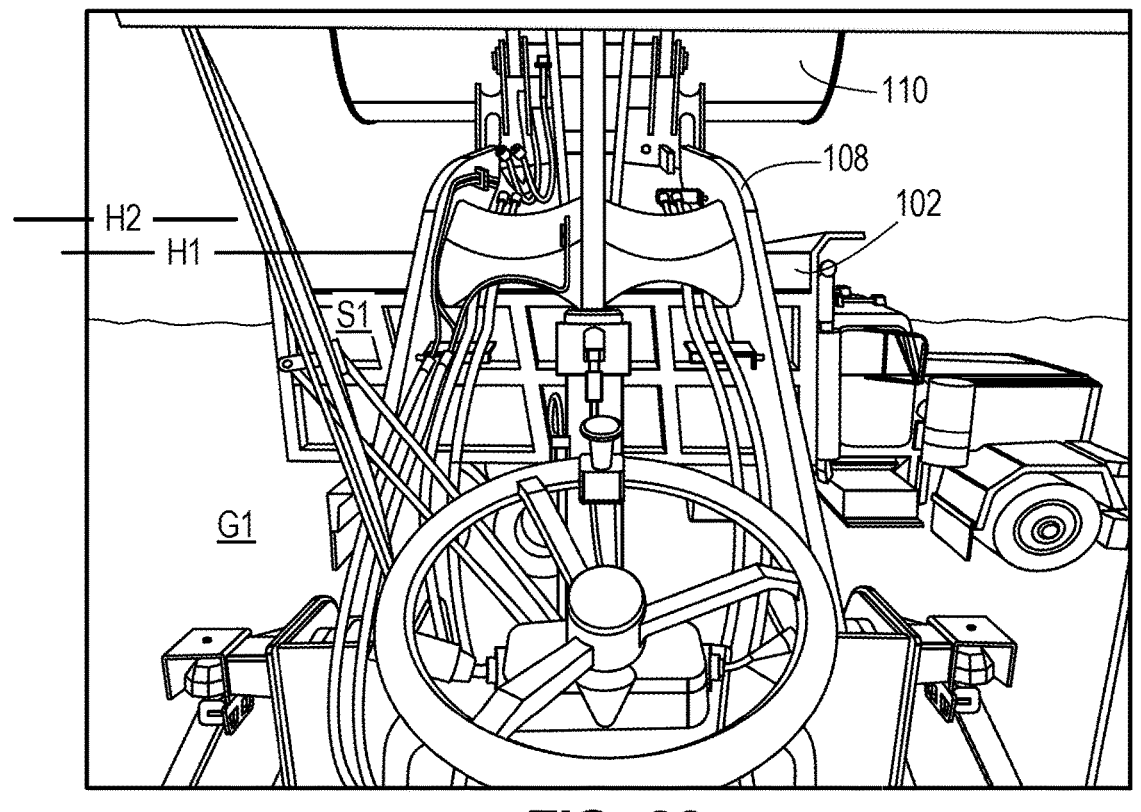

FIG. 23 illustrates the operator station view with the work vehicle in the fourth position of FIG. 22.

Figure 24:
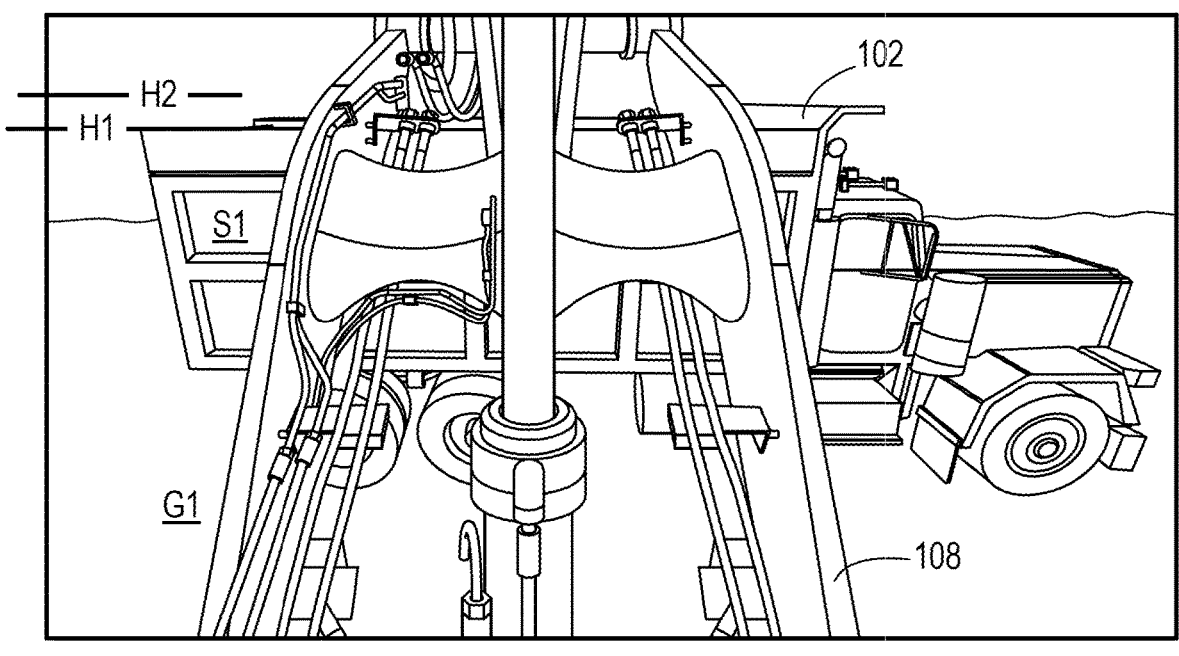

FIG. 24 illustrates the first perception sensor view with the work vehicle in the fourth position of FIG. 22.

Figures 25, 26:
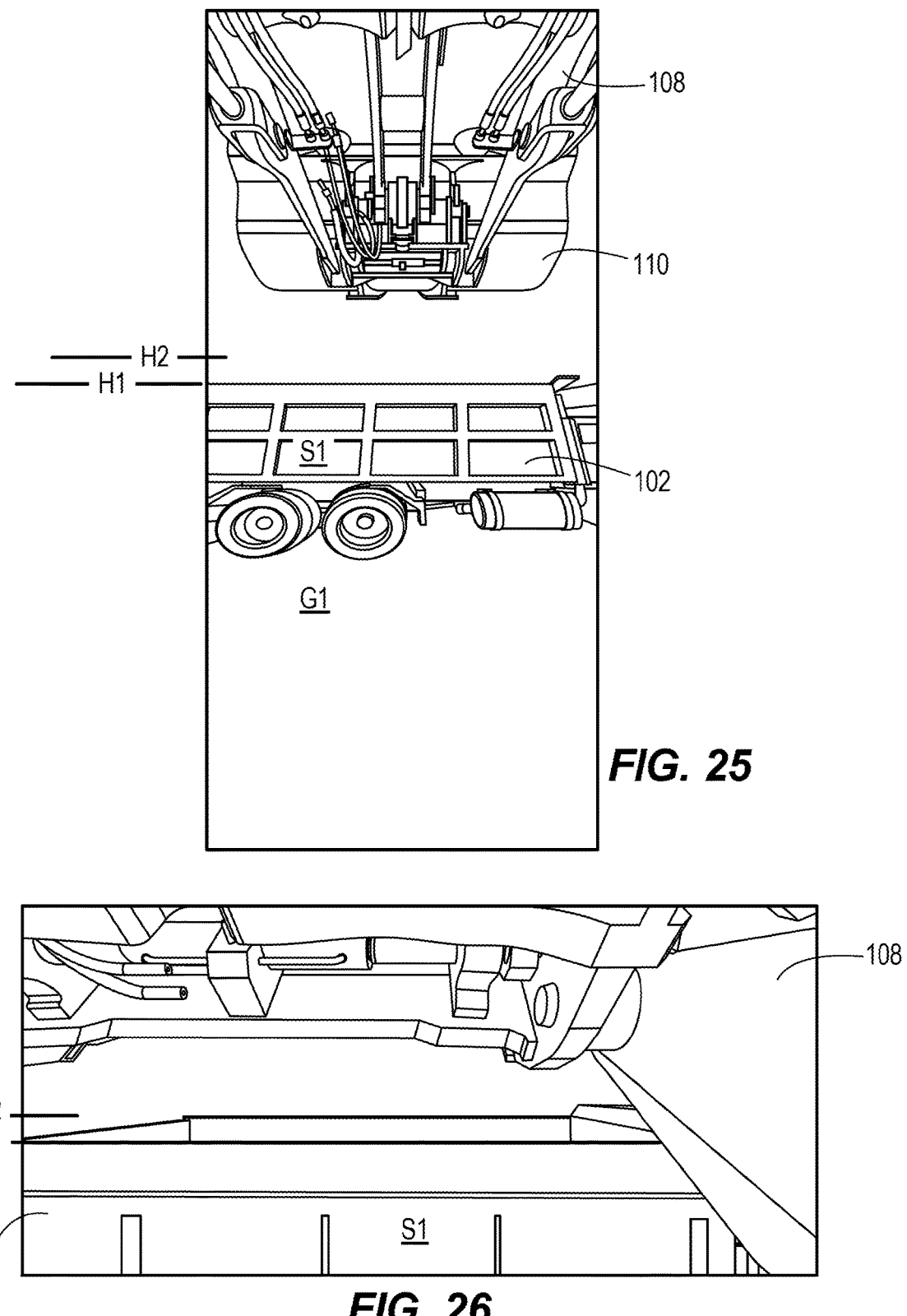

FIG. 25 illustrates the second perception sensor view with the work vehicle in the fourth position of FIG. 22.

FIG. 26 illustrates the third perception sensor view with the work vehicle in the fourth position of FIG. 22.

Figure 27:
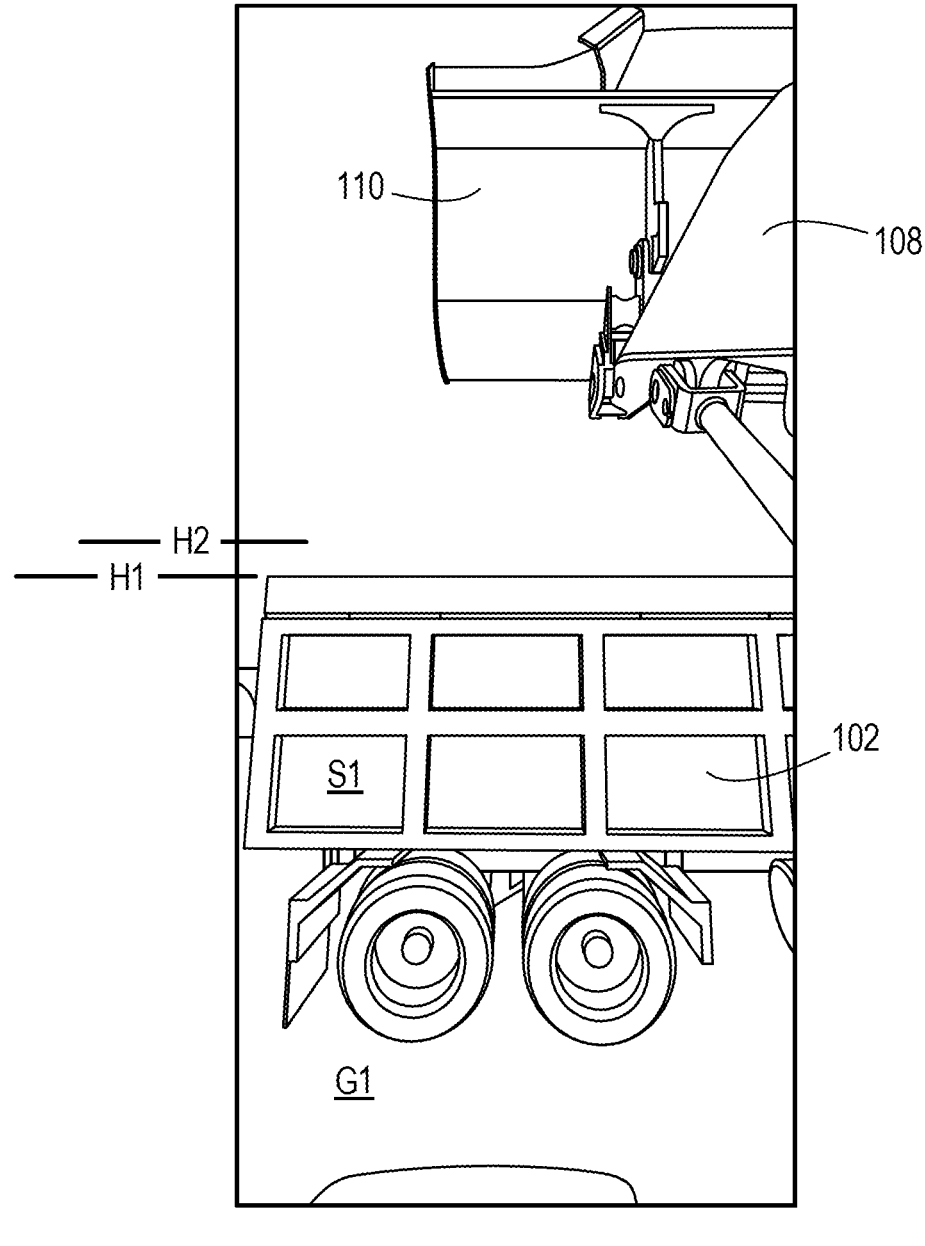

FIG. 27 illustrates the fourth perception sensor view with the work vehicle in the fourth position of FIG. 22.

Figure 28:
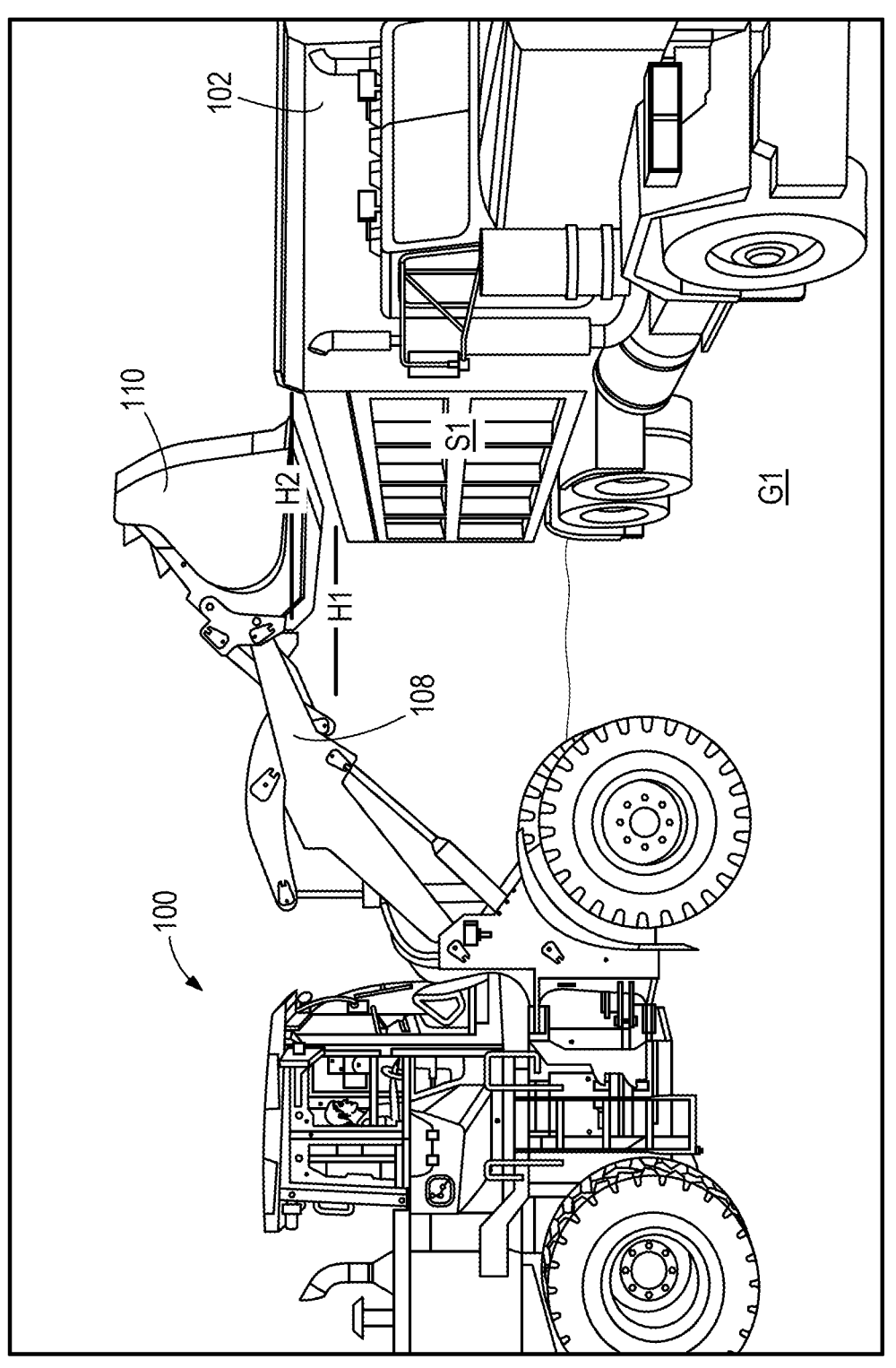

FIG. 28 illustrates a side elevation view of the work vehicle in a fifth position.

Figure 29:
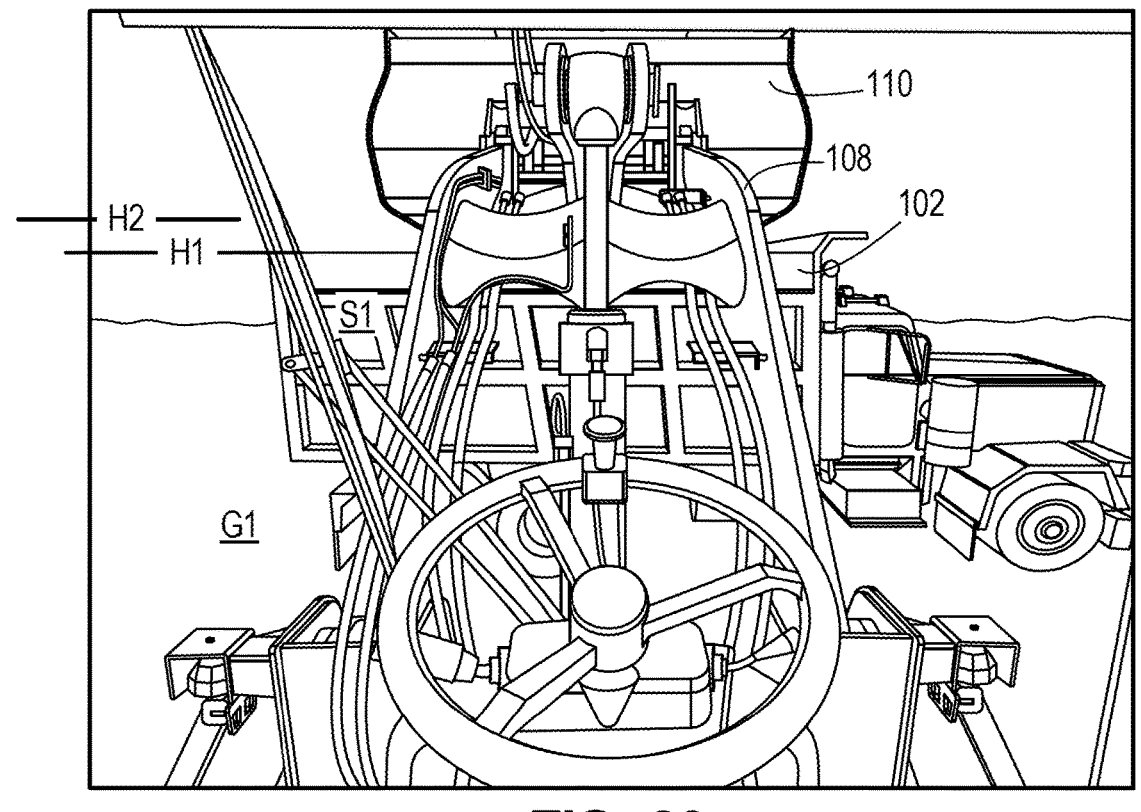

FIG. 29 illustrates the operator station view with the work vehicle in the fifth position of FIG. 28.

Figure 30:
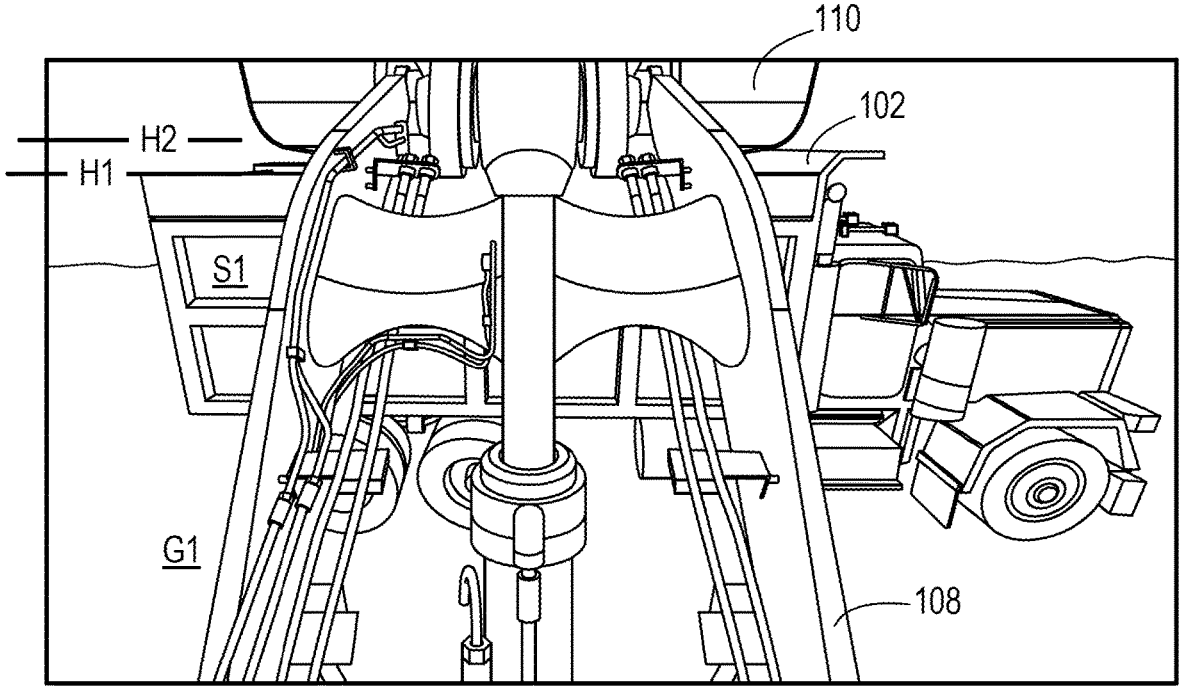

FIG. 30 illustrates the first perception sensor view with the work vehicle in the fifth position of FIG. 28.

Figures 31, 32:
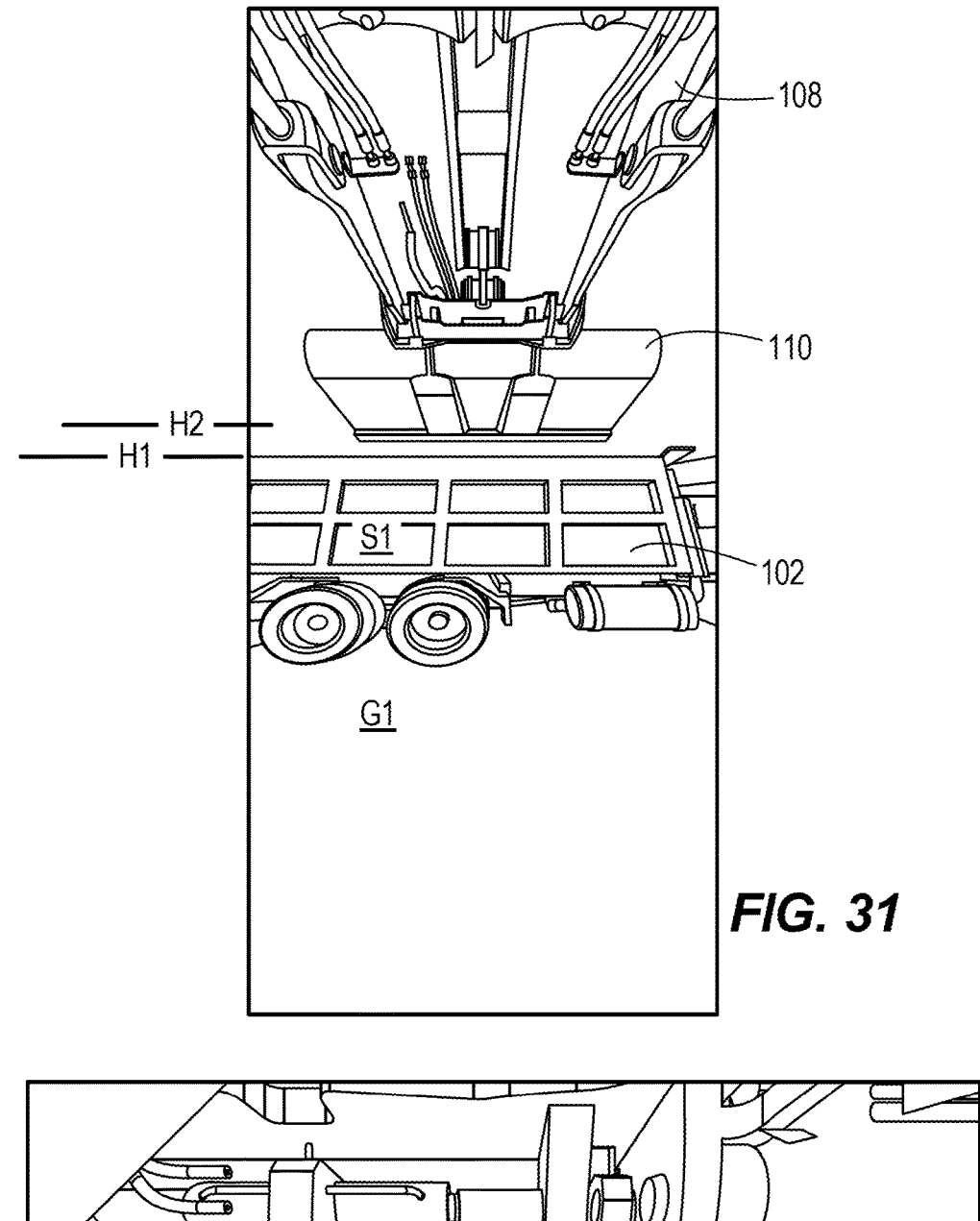

FIG. 31 illustrates the second perception sensor view with the work vehicle in the fifth position of FIG. 28.

FIG. 32 illustrates the third perception sensor view with the work vehicle in the fifth position of FIG. 28.

Figure 33:
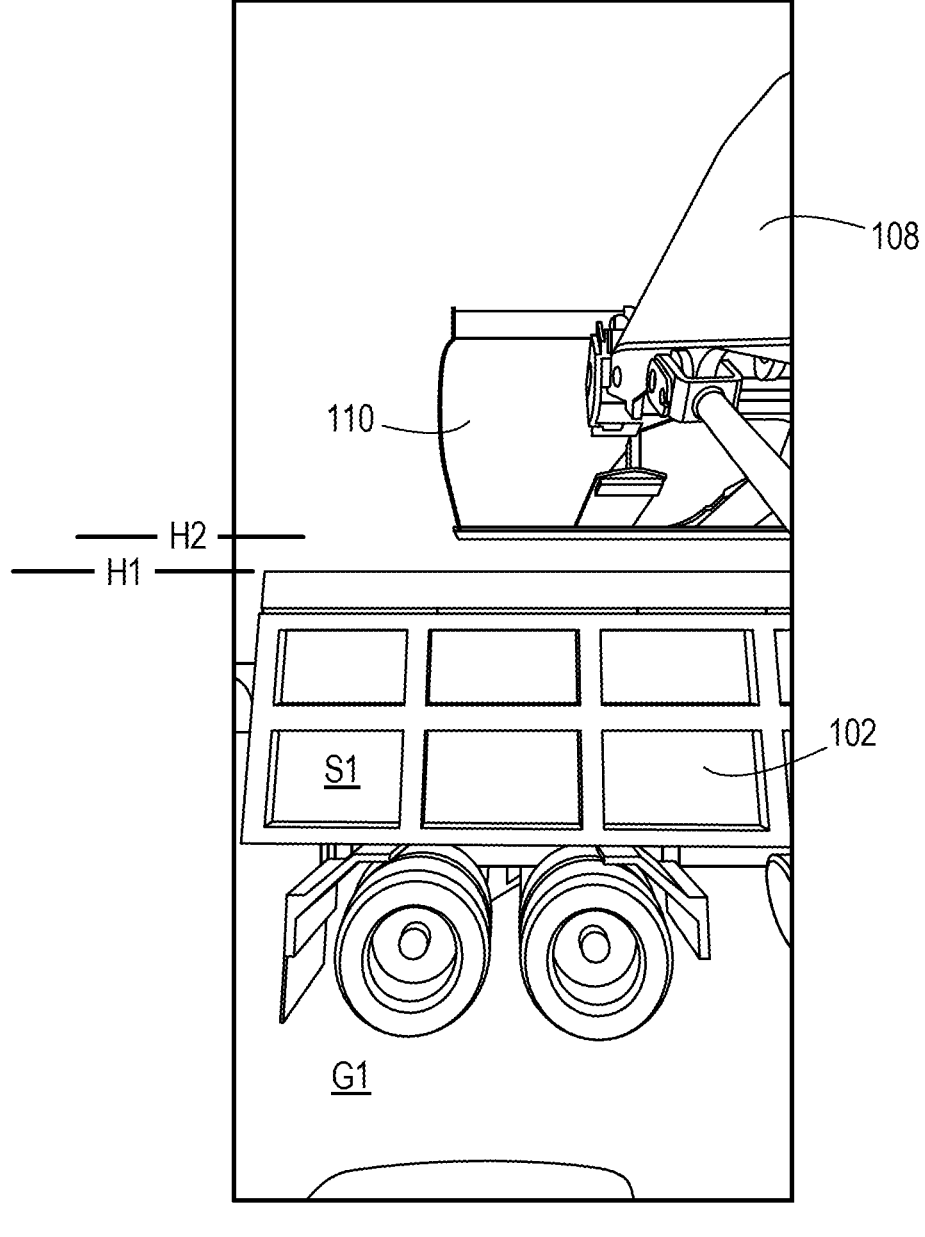

FIG. 33 illustrates the fourth perception sensor view with the work vehicle in the fifth position of FIG. 28.

Figure 34:
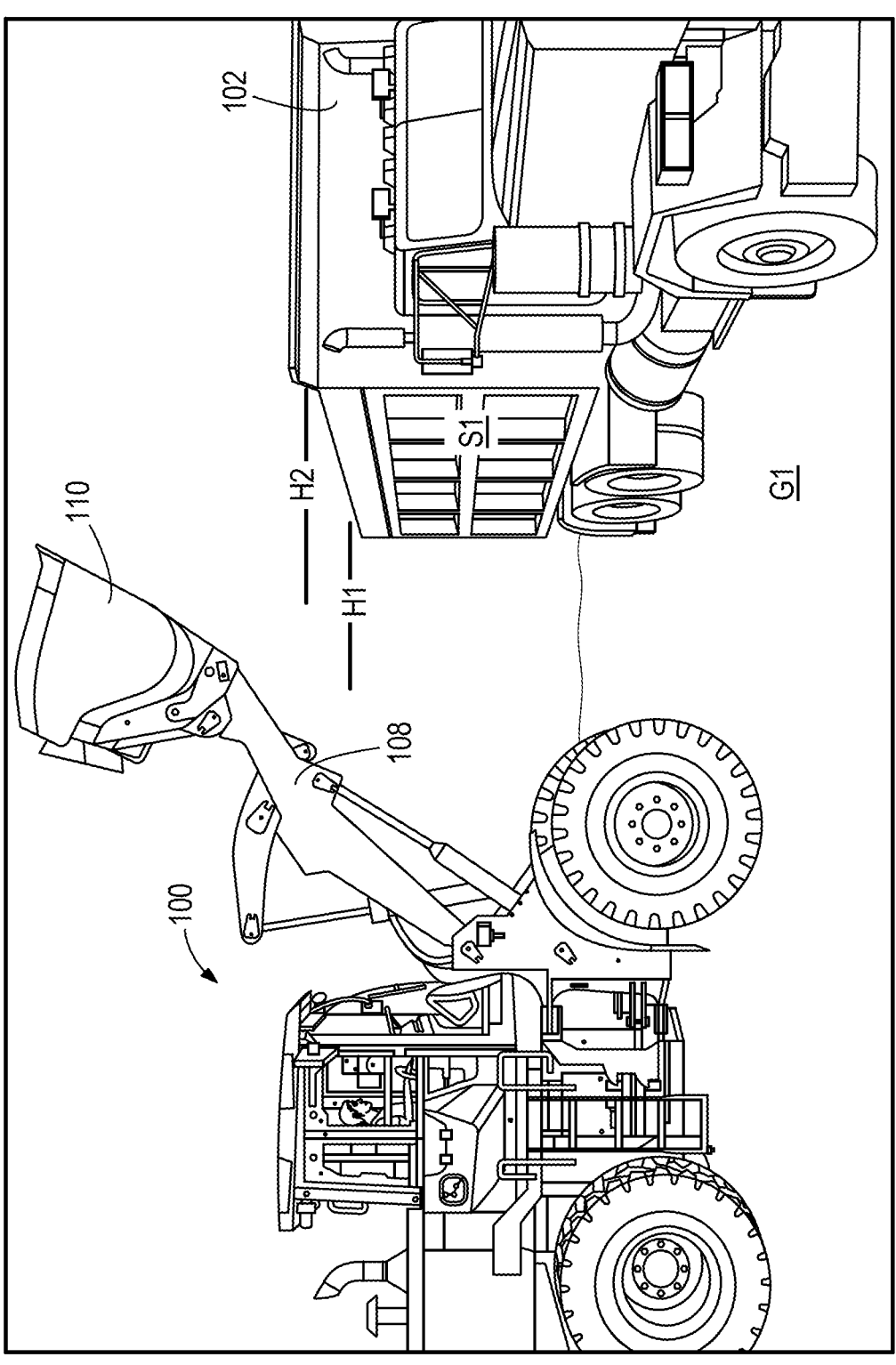

FIG. 34 illustrates a side elevation view of the work vehicle in a sixth position.

Figure 35:
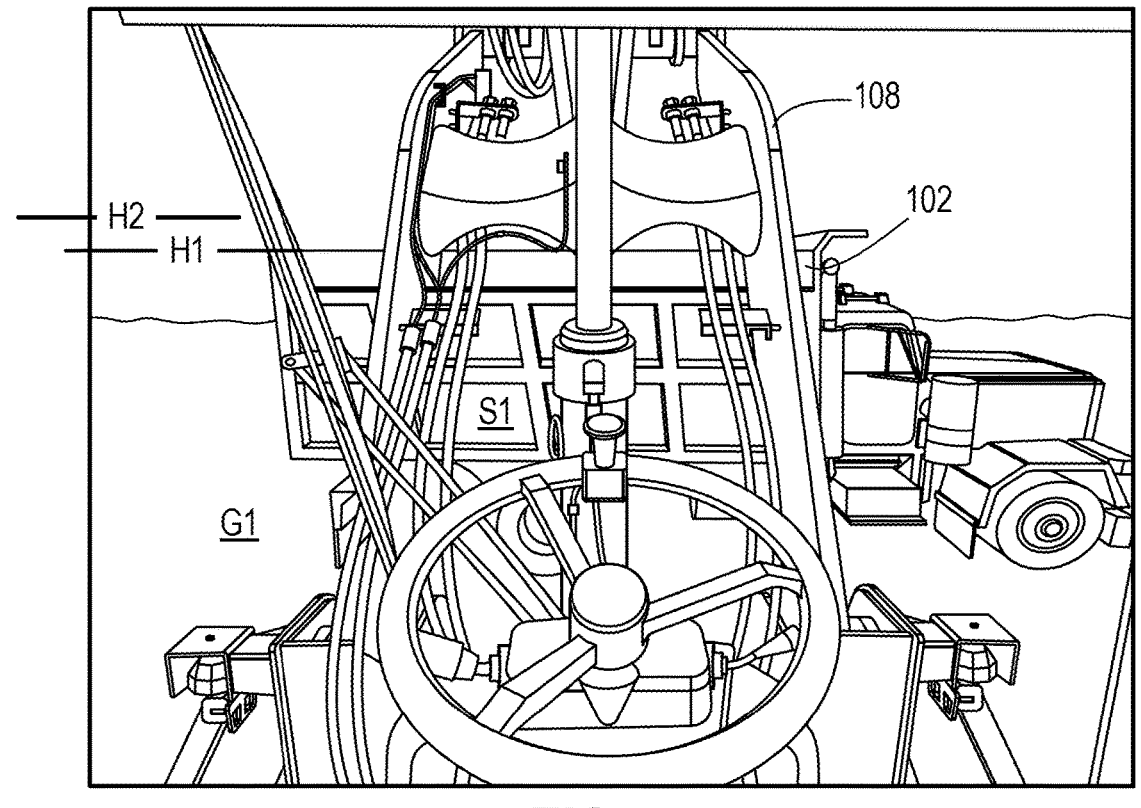

FIG. 35 illustrates the operator station view with the work vehicle in the sixth position of FIG. 34.

Figure 36:
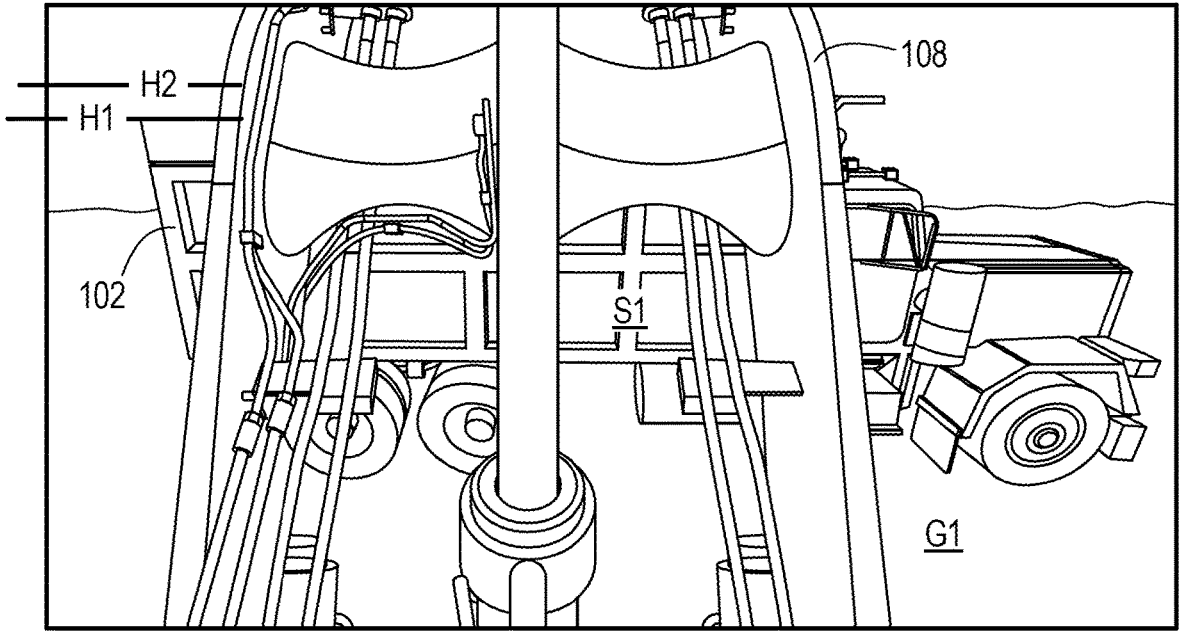

FIG. 36 illustrates the first perception sensor view with the work vehicle in the sixth position of FIG. 34.

Figures 37, 38:
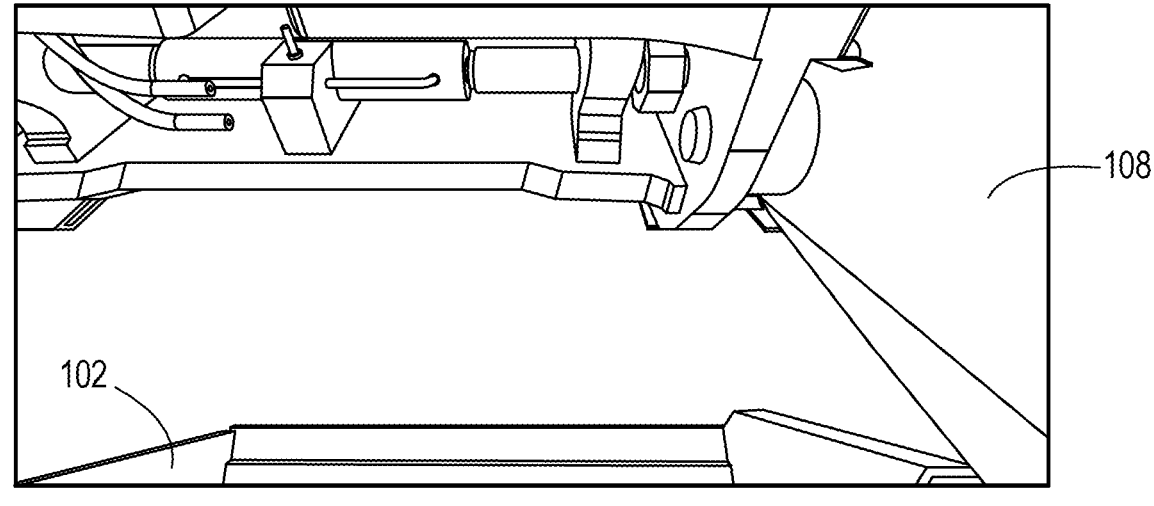

FIG. 37 illustrates the second perception sensor view with the work vehicle in the sixth position of FIG. 34.

FIG. 38 illustrates the third perception sensor view with the work vehicle in the sixth position of FIG. 34.

Figure 39:
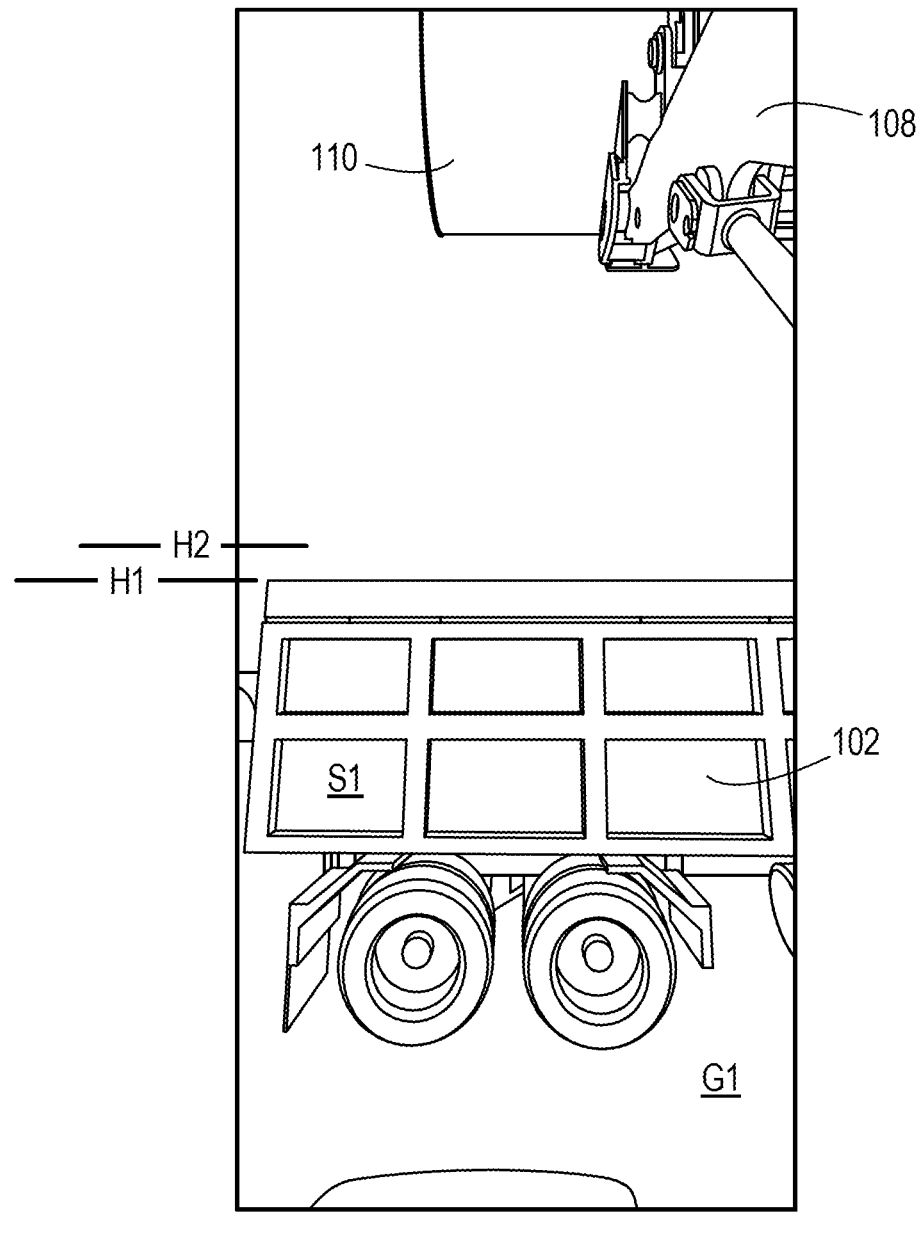

FIG. 39 illustrates the fourth perception sensor view with the work vehicle in the sixth position of FIG. 34.

FIG. 40A illustrates a method of operating a work vehicle, according to embodiments described herein.

Figure 40B:
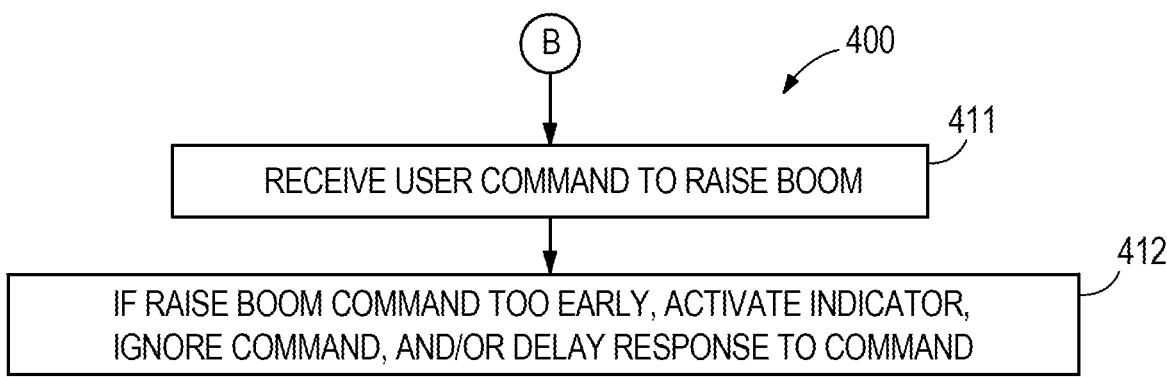

FIG. 40B illustrates a continuation of the method of FIG. 40A, according to embodiments described herein.

Figure 40C:
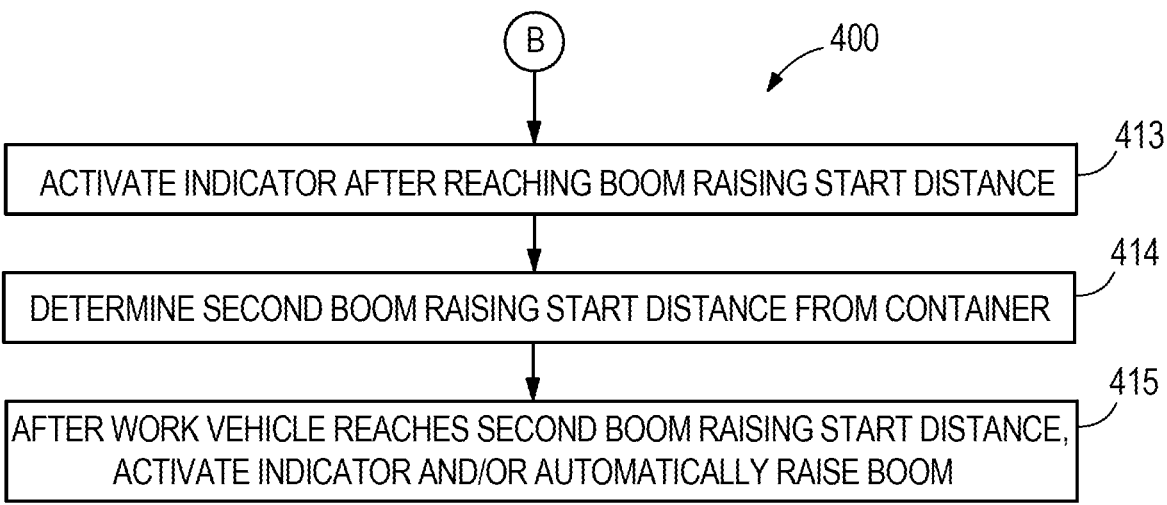

FIG. 40C illustrates another continuation of the method of FIG. 40A, according to embodiments described herein.

Figure 40D:
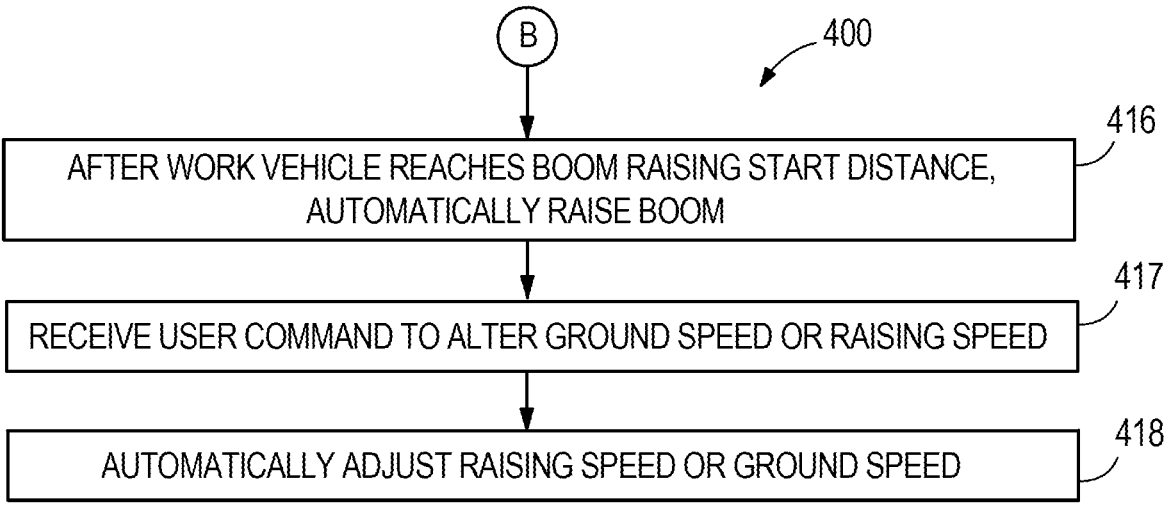

FIG. 40D illustrates another continuation of the method of FIG. 40A, according to embodiments described herein.

DETAILED DESCRIPTION

Approaching and loading a container with a work vehicle is a difficult task that requires operator experience and close attention to the approaching environment. Even expert operators cannot maximize the efficiency and speed of this process due to human limitations. Further, operator error is also a potential hazard on the job site. As such, it would be beneficial to provide a container load assist system and method for a work vehicle.

Figure 1:
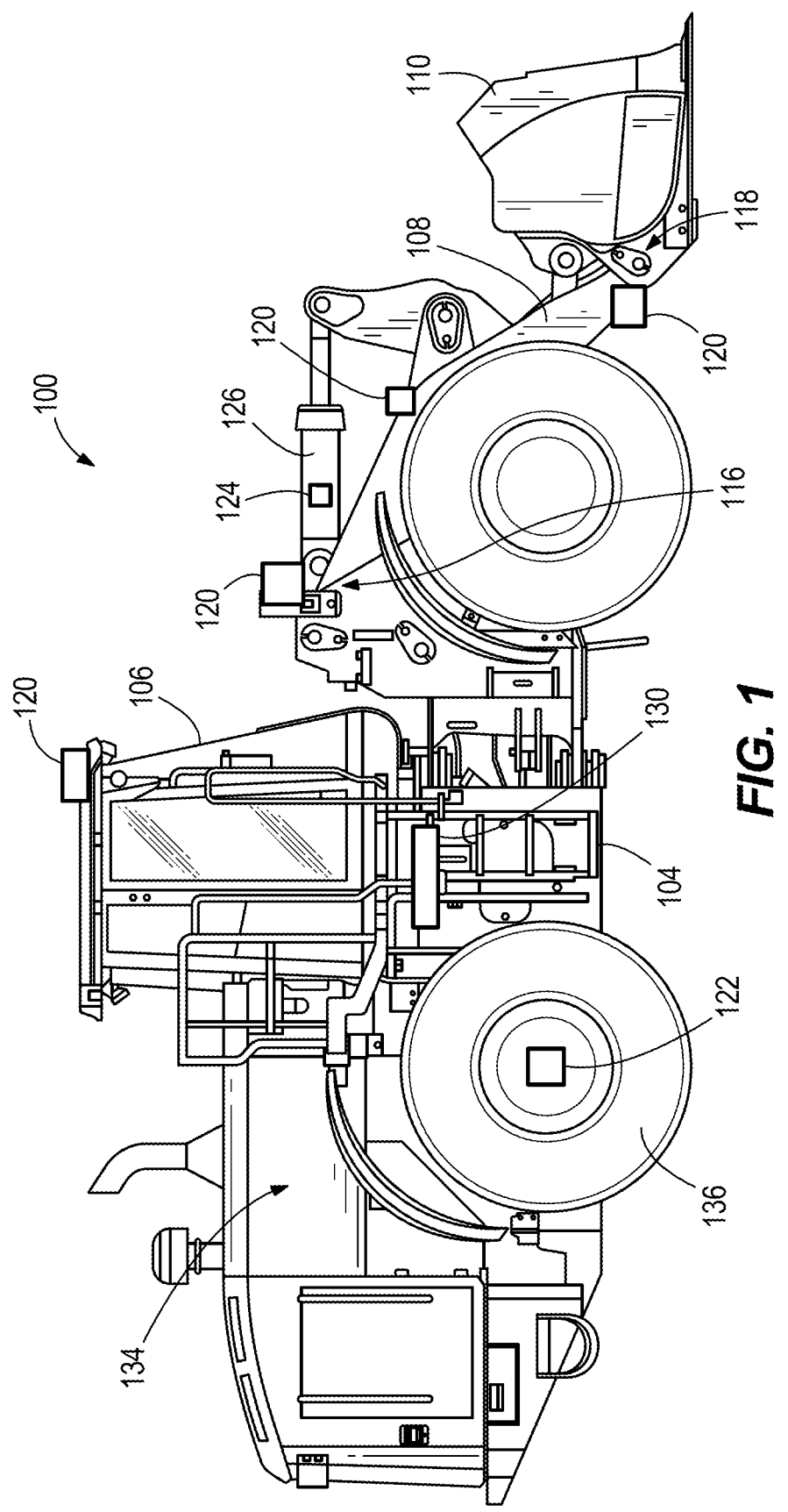
FIG. 1 illustrates a work vehicle, according to embodiments described herein.
Figure 4:
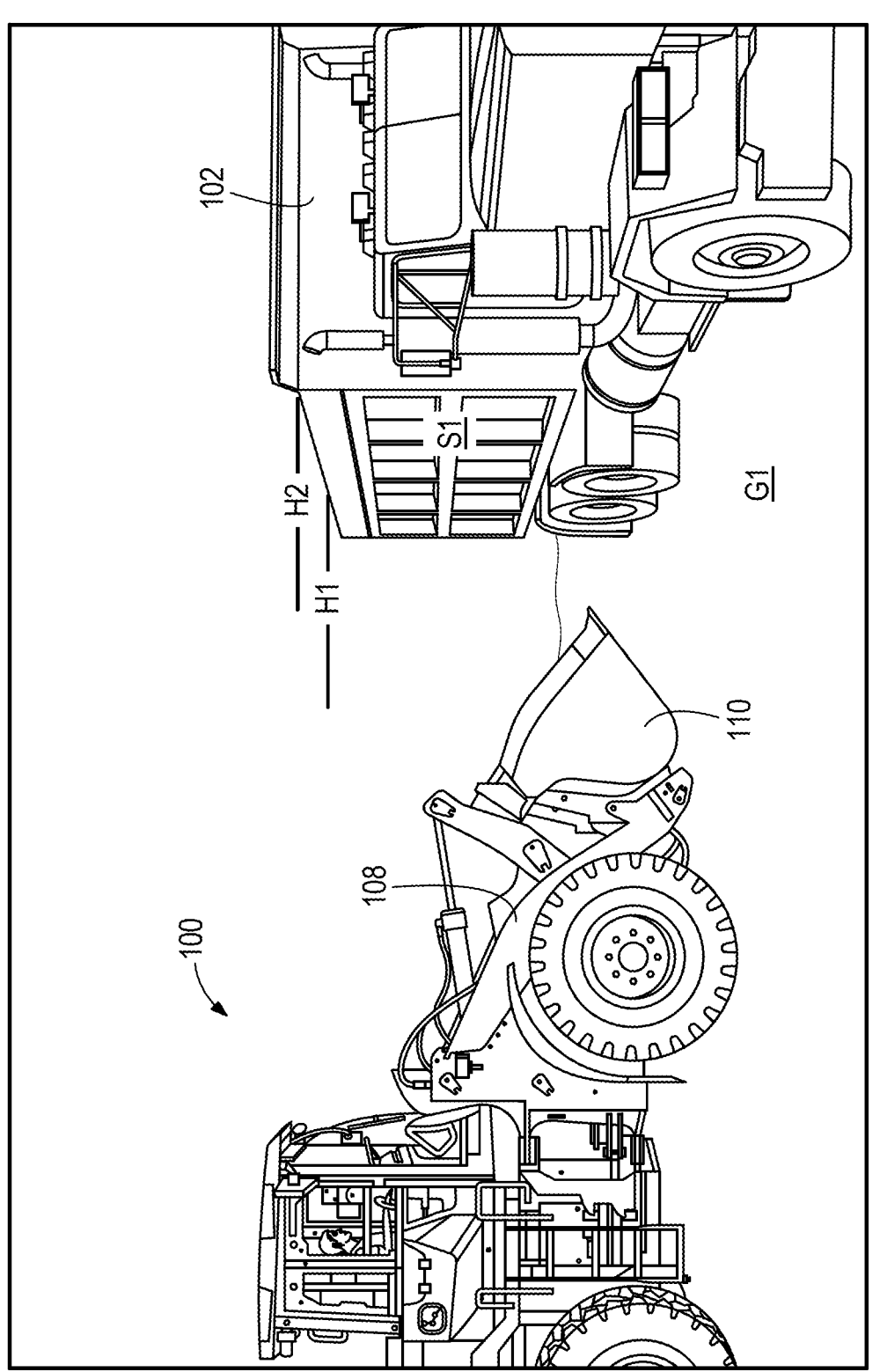
FIG. 4 illustrates a side elevation view of the work vehicle in a first position, according to embodiments described herein.

For example, FIG. 1 illustrates a work vehicle (e.g., a loader) 100 to load a container 102 (shown in FIG. 4). The work vehicle 100 includes a frame 104, an operator station 106, a boom 108, and an implement 110.

Figure 6:
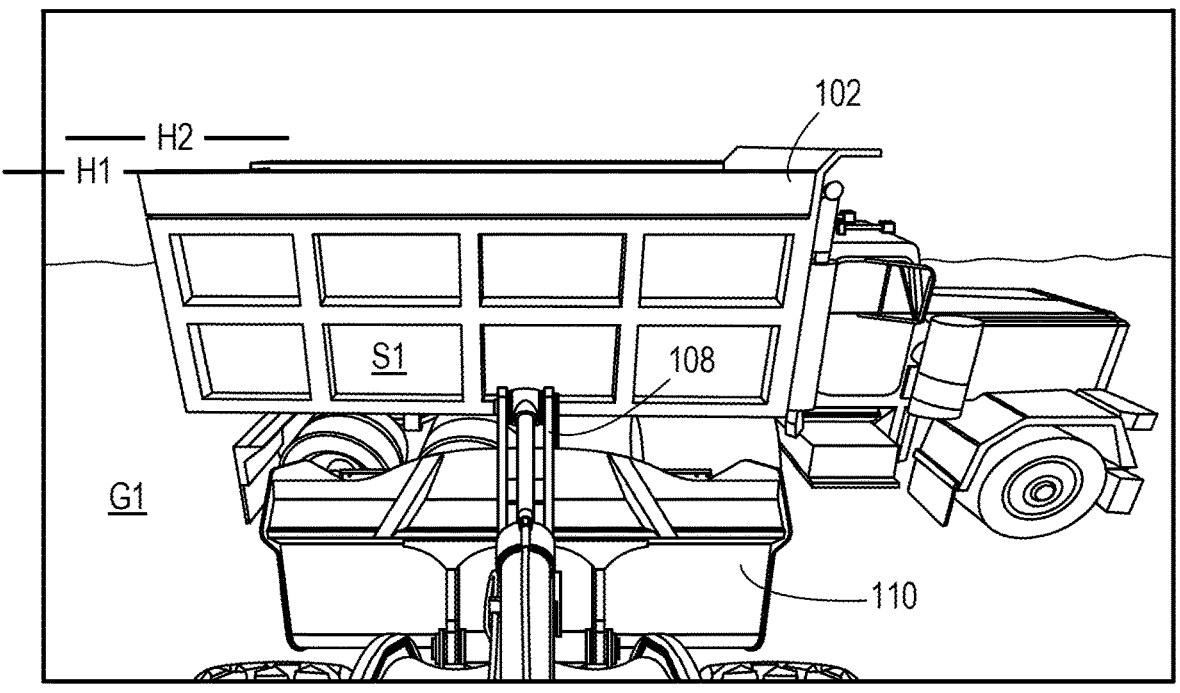
FIG. 6 illustrates a first perception sensor view with the work vehicle in the first position of FIG. 4.
Figure 7:
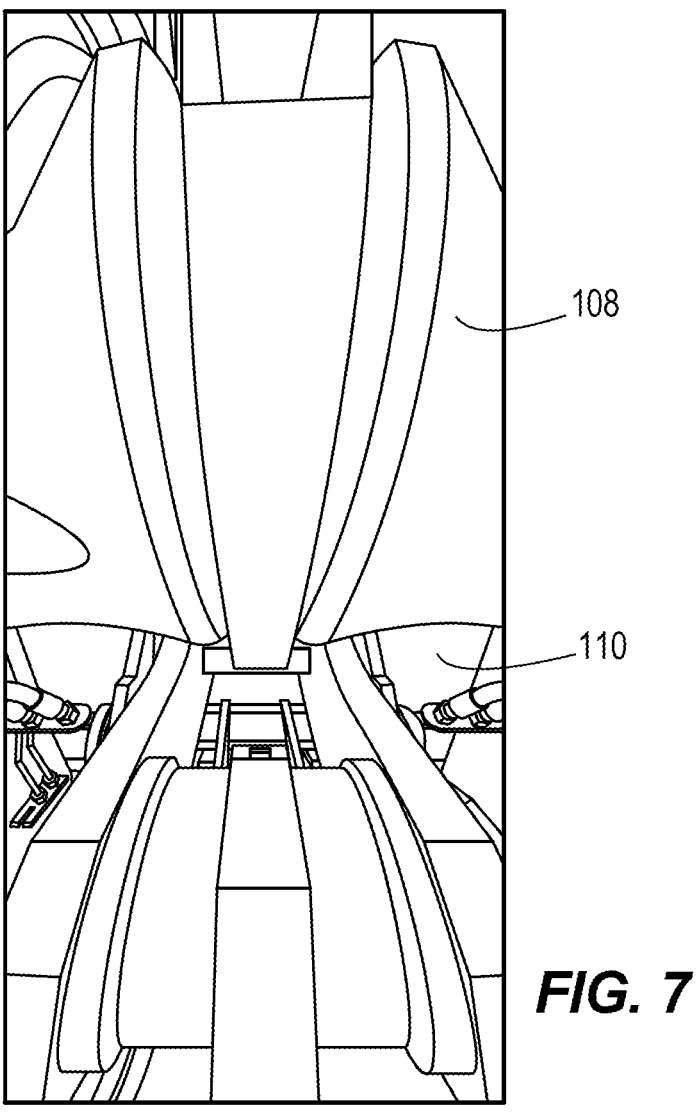
FIG. 7 illustrates a second perception sensor view with the work vehicle in the first position of FIG. 4.
Figure 8:
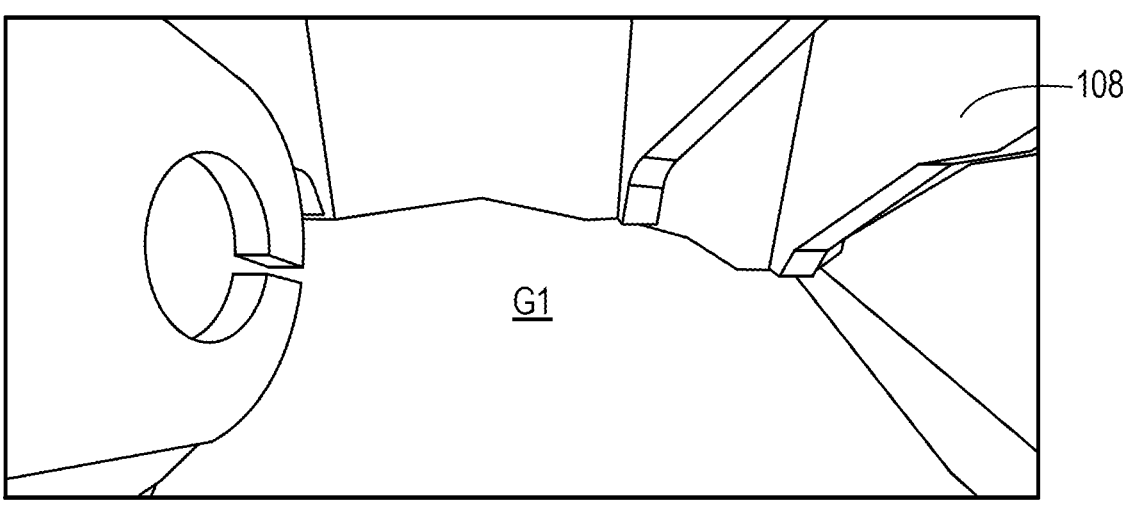
FIG. 8 illustrates a third perception sensor view with the work vehicle in the first position of FIG. 4.
Figure 9:
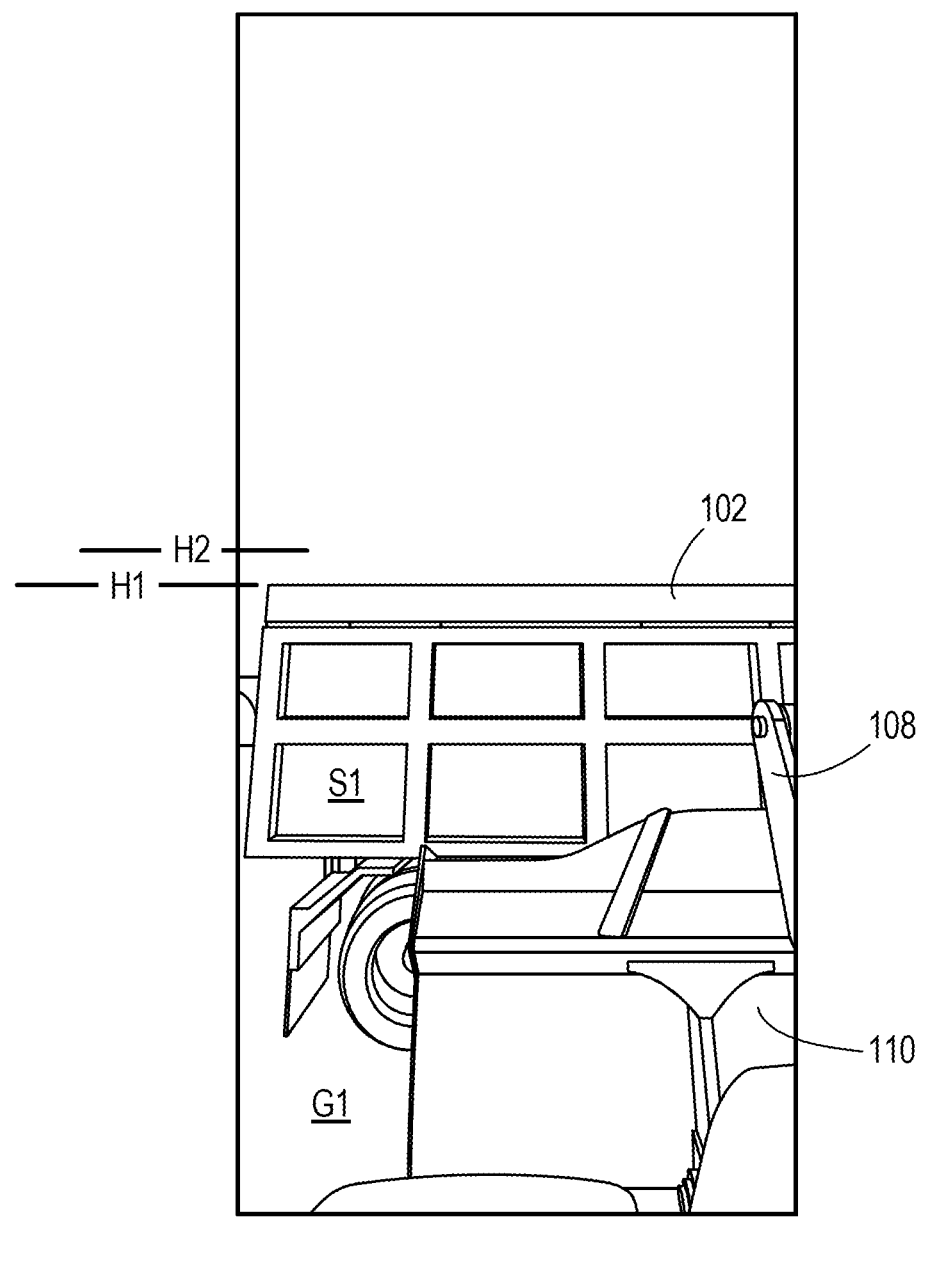
FIG. 9 illustrates a fourth perception sensor view with the work vehicle in the first position of FIG. 4.

The operator station 106 is coupled to the frame 104 in the illustrated embodiment. The operator station 106 includes a plurality of controls 112 and indicators 114 (shown in FIG. 6). The controls 112 may include a steering wheel, one or more levers, one or more buttons, one or more switches, or the like. Of course, other embodiments may include a user interface (including the controls 112 and indicators 114) that is remote from the work vehicle 100 (described in more detail below). Some or all of the controls 112 in the illustrated embodiment are drive-by-wire controls, which is to say the user input does not directly drive the respective components of the work vehicle 100. Instead, the user input is an input received by a controller (discussed more below), and the controller itself commands the respective components of the work vehicle.

The boom 108 includes a proximal end 116 coupled to the frame 104 and a distal end 118 opposite the proximal end 116. The boom 108 may include one or more arms, and the illustrated embodiment includes a boom 108 having two arms. The implement 110 is coupled to the distal end 118 of the boom 108. The implement 110 may be removably coupled to the boom 108. The implement 110 may be, for instance, a bucket (illustrated embodiment), one or more tines (similar to a forklift), a grapple, or the like.

The work vehicle 100 further includes at least one perception sensor 120. In some embodiments, the work vehicle 100 includes a plurality of perception sensors 120. FIG. 1 shows multiple potential perception sensor mounting locations. These mounting locations for the perception sensors 120 include, for instance, near the top of the operator station 106, adjacent the proximal end 116 of the boom 108, at a midpoint of the boom 108 between the proximal end 116 and the distal end 118, adjacent the distal end 118 of the boom 108, or the like. The perception sensor 120 may be, for instance, lidar, radar, stereo vision, some combination thereof, or the like. The perception sensor 120 is configured to sense an approaching environment during travel of the work vehicle 100.

The work vehicle 100 also includes at least one ground speed sensor 122. In some embodiments, the work vehicle 100 includes a plurality of ground speed sensors 122. The ground speed sensor 122 may be, for instance, a sensor configured to detect the rotational speed of a driveshaft, a wheel, or the like. The ground speed sensor 122 may alternatively be, for instance, an optical sensor detecting the ground as it passes the work vehicle 100. In other embodiments, the ground speed sensor 122 may alternatively be, for instance, part of a global positioning system (GPS), part of an inertial navigation system (INS), or the like.

The work vehicle 100 also includes at least one position sensor 124. In some embodiments, the work vehicle 100 includes a plurality of position sensors 124. The position sensor 124 may be, for instance, a hydraulic pressure sensor, a global positioning sensor, a Hall effect sensor, a current sensor, a piezo-electric transducer, or the like. The position sensor 124 may provide sensor data relating to a position of a portion of the boom 108 (such as the distal end 118 of the boom 108), a position of the implement 110, or the like.

The work vehicle 100 further includes a hydraulic system having hydraulic cylinders 126, one or more hydraulic pumps 128, valves 130 (shown schematically in FIG. 2), and the like. Some embodiments further include at least one accumulator 132 (shown schematically in FIG. 2) configured to supply additional pressure to at least one of the hydraulic cylinders 126. The hydraulic system is configured to move the boom 108 and/or the implement 110. Other components of the work vehicle 100 may also be operated via the hydraulic system.

The work vehicle 100 also includes an engine 134 coupled to the frame 104. The engine 134 is configured to drive wheels 136 of the work vehicle 100. In some embodiments, the engine 100 is configured to indirectly drive the boom 108 and/or implement 110 via the hydraulic system described herein. In some embodiments, the work vehicle 100 further includes a parallel drivetrain 138 (shown schematically in FIG. 2) driven by the engine 134. The parallel drivetrain 138 allows the engine 134 to drive both the wheels

136 and the hydraulic system in parallel. Some components of the work vehicle 100 may additionally or alternatively be driven by one or more solenoids, electric motors 140 (shown schematically in FIG. 2), or the like.

Figure 2:
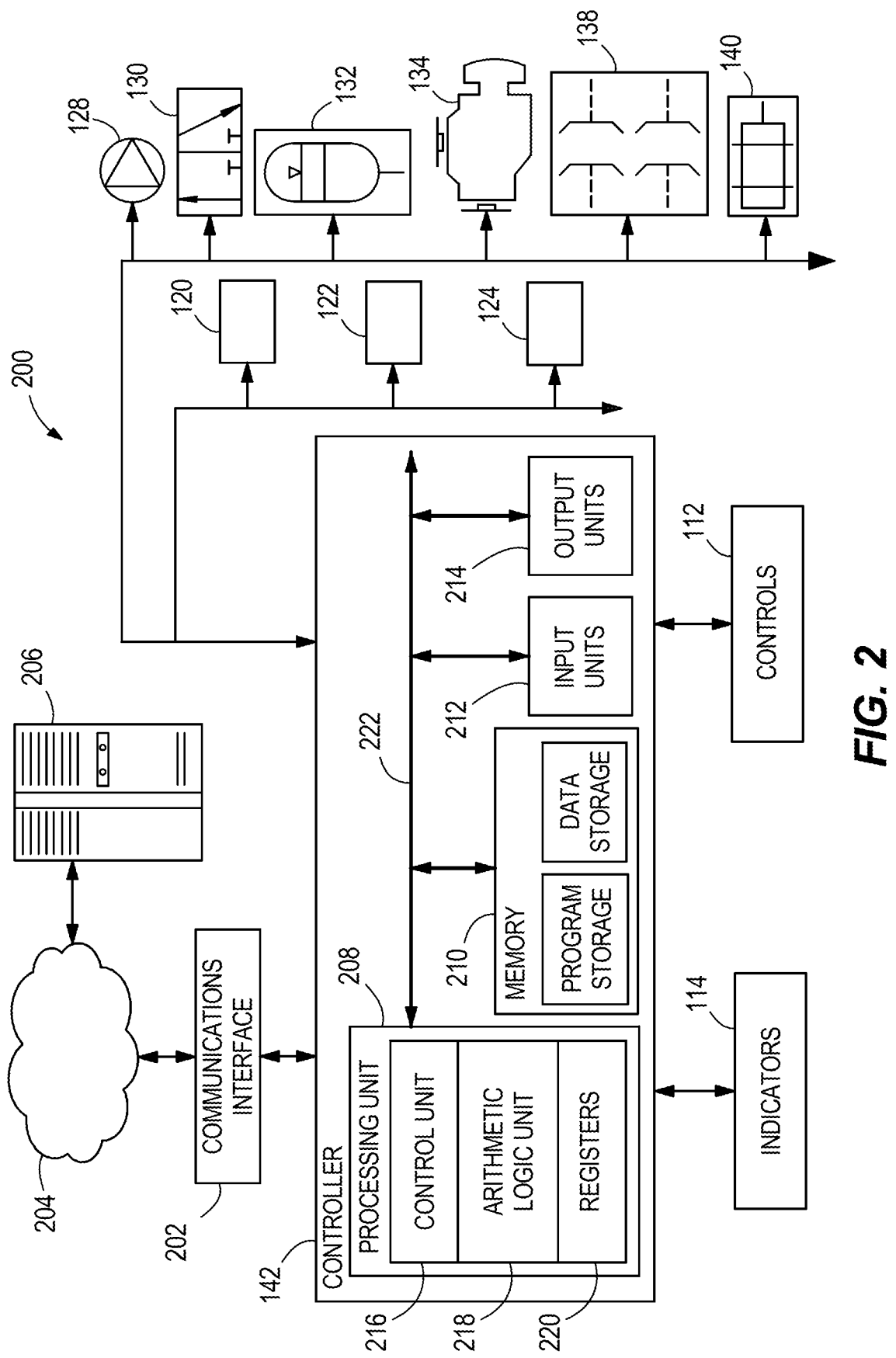
FIG. 2 schematically illustrates a system for operating the work vehicle of FIG. 1, according to embodiments described herein.

With reference to both FIG. 1 and FIG. 2, the work vehicle 100 also includes a controller 142 as part of a control system 200 of the work vehicle 100. As shown in FIG. 2, the control system 200 includes the controls 112 and the indicators 114 (together also considered the user interface), the perception sensor 120, the ground speed sensor 122, the position sensor 124, the hydraulic pump 128, the valve 130, the accumulator 132, the engine 134, the parallel drivetrain 138, and any electric motors 140.

In some embodiments, the control system 200 further includes a communications interface 202 configured to communicatively couple the controller 142 via, for instance, a network 204 to a server 206. The connections between the user interface 112, 114 and the controller 142 may also be via the network 204 in some embodiments. The connections between the user interface 112, 114 and the controller 142 are, for example, wired connections, wireless connections, or a combination of wireless and wired connections. Similarly, any of the connections between the various components of the control system 200 are wired connections, wireless connections, or a combination of wireless and wired connections.

The network 204 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 204 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

FIG. 2 also illustrates various portions of the controller 142. The controller 142 is electrically and/or communicatively connected to a variety of modules or components of the system 200. For example, the illustrated controller 142 is connected to one or more indicators 114 (e.g., LEDs, a liquid crystal display ["LCD"], other visual indicators, a speaker, other audio indicators, a vibration motor, other tactile indicators, some combination thereof, etc.), a user input or controls 112 (e.g., the controls of FIG. 6), and the communications interface 202. The communications interface 202 is connected to the network 204 to enable the controller 142 to communicate with the server 206. The controller 142 includes combinations of hardware and software that are operable to, among other things, control the operation of the system 200 including various components of the work vehicle 100 such as the hydraulic pump 128, the valve 130, the accumulator 132, the engine 134, the parallel drivetrain 138, and the electric motor 140. The controller 142 further includes combinations of hardware and software that are operable to receive one or more signals from the perception sensor 120, the ground speed sensor 122, and the position sensor 124, communicate over the network 204, receive input from a user via the controls 112, provide information to a user via the indicators 114, etc. In some embodiments, the indicators 114 and the controls 112 may be integrated together as a user interface in the form of, for instance, a touch-screen. Examples of user interfaces include, but are not limited to, a personal or desktop computer, a laptop computer, a tablet computer, or a mobile phone (e.g., a smart phone).

In some embodiments, the controller 142 is included within the user interface 112, 114, and, for example, the controller 142 can provide control signals directly to the hydraulic pump 128, the valve 130, the accumulator 132, the engine 134, the parallel drivetrain 138, and the electric motor 140 and receive signals directly from the perception sensor 120, the ground speed sensor 122, and the position sensor 124. In other embodiments, the controller 142 is associated with the server 206 and communicates through the network 204 to provide control signals and receive sensor signals.

The controller 142 includes a plurality of electrical and electronic components that provide power, operational control, and protection to the components and modules within the controller 142 and/or the system 200. For example, the controller 142 includes, among other things, a processing unit 208 (e.g., a microprocessor, a microcontroller, or another suitable programmable device), a memory 210, input units 212, and output units 214. The processing unit 208 includes, among other things, a control unit 216, an arithmetic logic unit ("ALU") 218, and a plurality of registers 220 (shown as a group of registers in FIG. 2), and is implemented using a known computer architecture (e.g., a modified Harvard architecture, a von Neumann architecture, etc.). The processing unit 208, the memory 210, the input units 212, and the output units 214, as well as the various modules or circuits connected to the controller 142 are connected by one or more control and/or data buses (e.g., common bus 222). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 208 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. Software included in the implementation of the system 200 and controller 142 can be stored in the memory 210 of the controller 142. The software includes, for example, firmware, one or more applications, program data, filters, rules, one or more program modules, and other executable instructions. The controller 142 is configured to retrieve from the memory 210 and execute, among other things, instructions related to the control processes and methods described herein. In other embodiments, the controller 142 includes additional, fewer, or different components.

The controls 112 are included to provide user control of the system 200. The controls 112 are operably coupled to the controller 142 to control, for example, the hydraulic pump 128, the valve 130, the accumulator 132, the engine 134, the parallel drivetrain 138, and the electric motor 140. The controls 112 can include any combination of digital and analog input devices required to achieve a desired level of control for the system 200. For example, the user interface 112, 114 can include a computer having a display and input devices, a touch-screen display, a plurality of knobs, dials, switches, buttons, faders, or the like.

In a manual operation mode, the user may operate the work vehicle 100 in a conventional manner via the controls 112. The system 200 may be operable to indicate a variety of statuses during user operation in the manual operation mode to aid the user. Because many of the components of the work vehicle 100 are drive-by-wire, however, an automatic mode or semi-automatic mode is also available. Described in more detail below, the user may initiate a container load operation by driving the work vehicle 100 toward the container 102. The system 200 described herein may take over control of the work vehicle 100 to perform the container load operation, which may include ignoring one or more user control commands received via the controls 112 including, for instance, the degree of pressing the accelerator pedal, any steering adjustments, any boom raising/lower adjustments, or the like. Of course, the user may elect to cancel the container load operation with one or more specific commands which may be, for instance, applying the brake pedal, removing the user's foot from the accelerator pedal, placing the work vehicle 100 in reverse, engaging a dedicated "cancel container load operation" button, or the like.

Figure 3B:
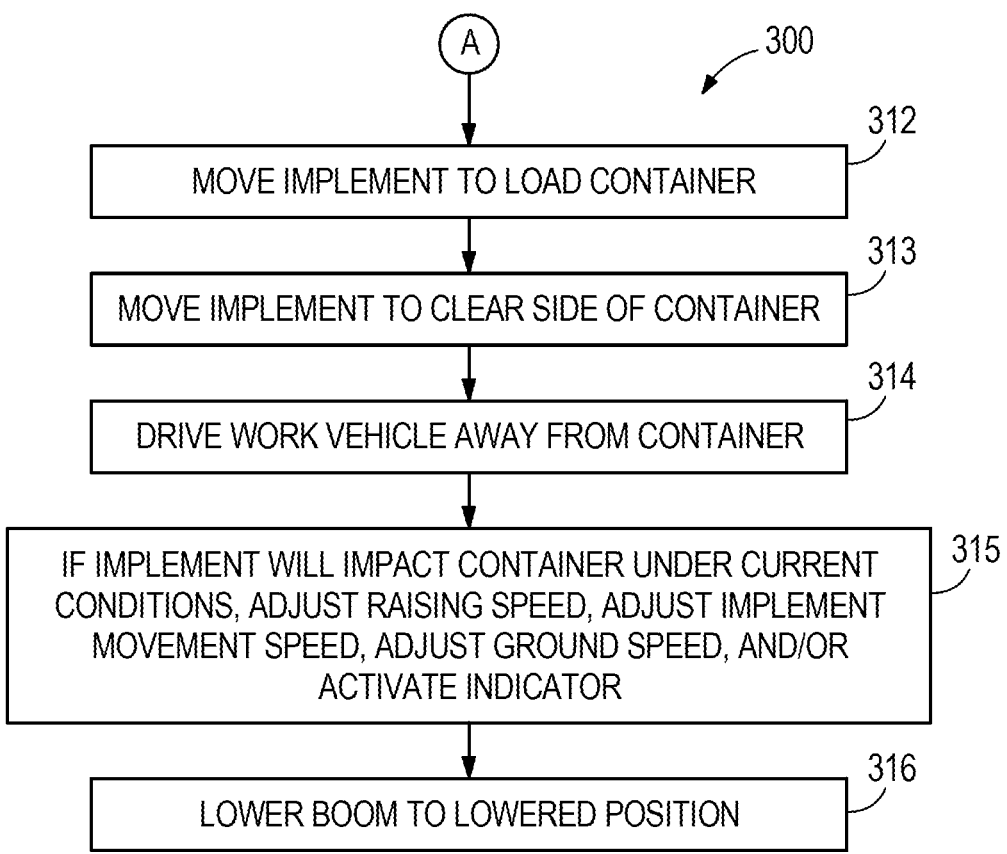
FIG. 3B illustrates a continuation of the method of FIG. 3A.
Figure 5:
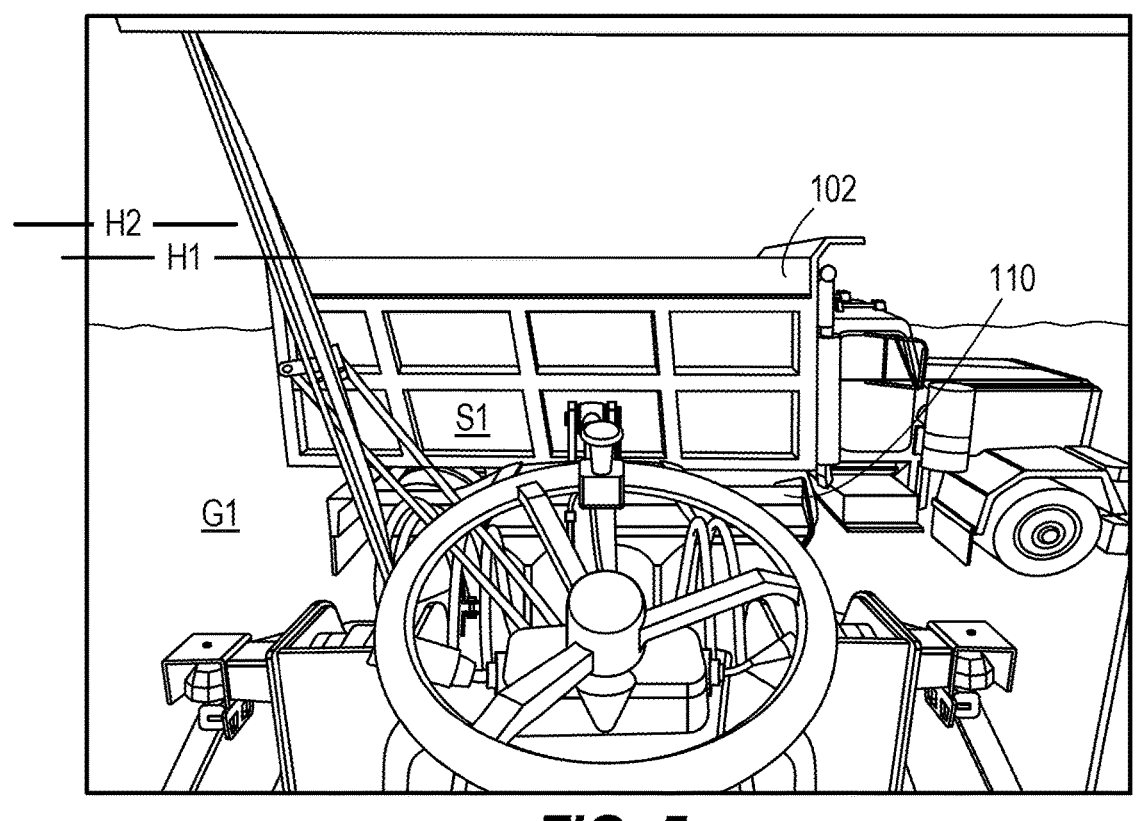
FIG. 5 illustrates an operator station view with the work vehicle in the first position of FIG. 4.

The system 200, including the work vehicle 100, is configured to operate according to the method 300 shown in FIGS. 3A and 3B. The method 300 begins with the controller 142 receiving a user command via the controls 112 to drive the work vehicle 100 toward a container 102 (e.g., a truck, a hopper, a platform, or the like) (at step 301). This step 301 may include only driving toward the container 102, but other embodiments may additionally or alternatively include engaging a dedicated "begin container load operation" button or the like. This method 300 may begin with the work vehicle 100 spaced away from the container 102 at a first position (represented by FIG. 4). The operator's view from the operator station 106 in this first position may appear, for instance, as shown in FIG. 5. In this first position, the perception sensor(s) at the various potential sensor placement locations discussed herein are oriented and configured to sense the approaching environment in front of the work vehicle 100. The various sensor positions have the "views" shown in FIGS. 6-9. Of course, "views" should not be considered limiting, as some embodiments include sensors that operate with sound, for instance, instead of visual input.

Figure 10:
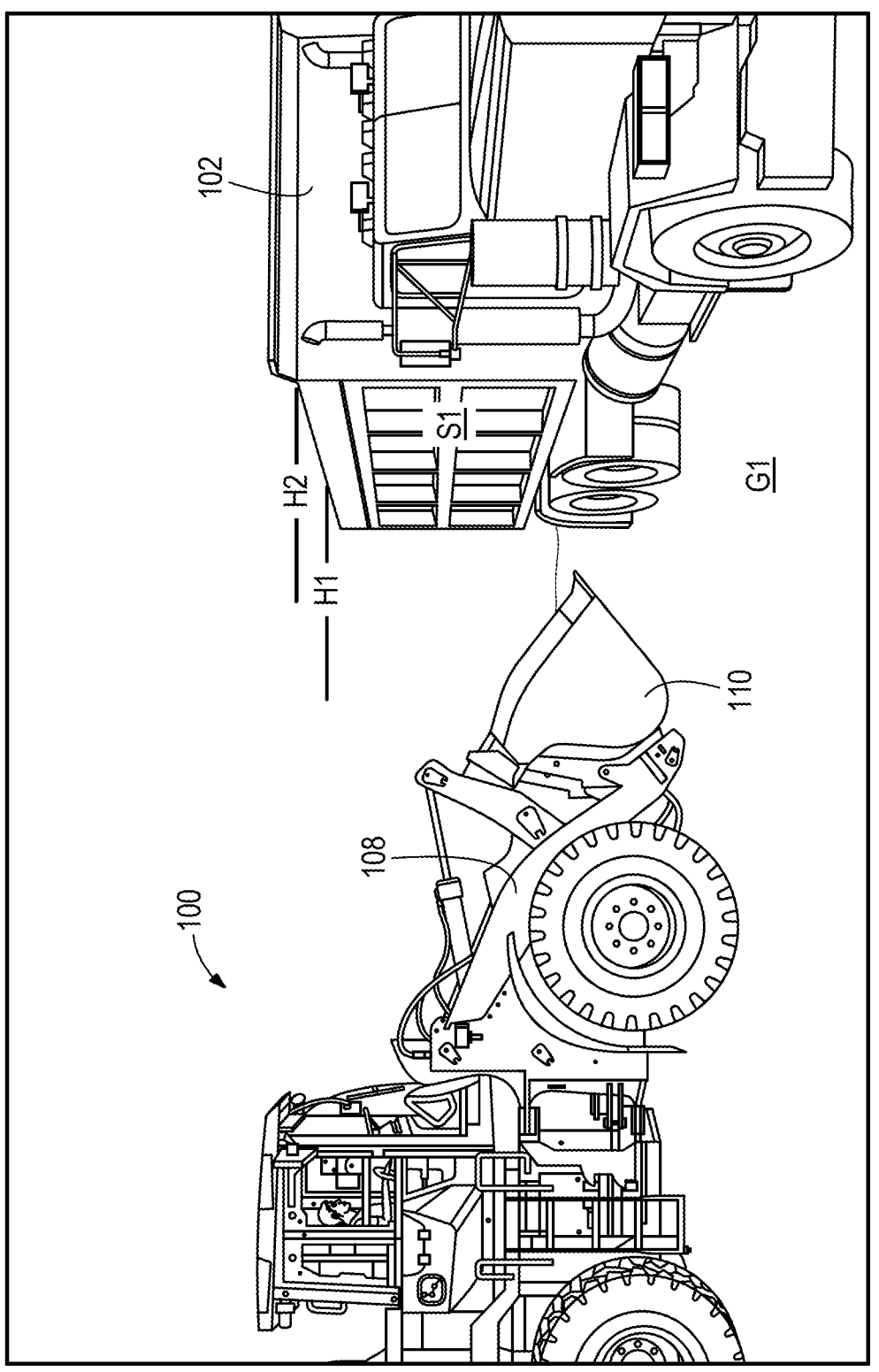
FIG. 10 illustrates a side elevation view of the work vehicle in a second position.
Figures 11, 12:
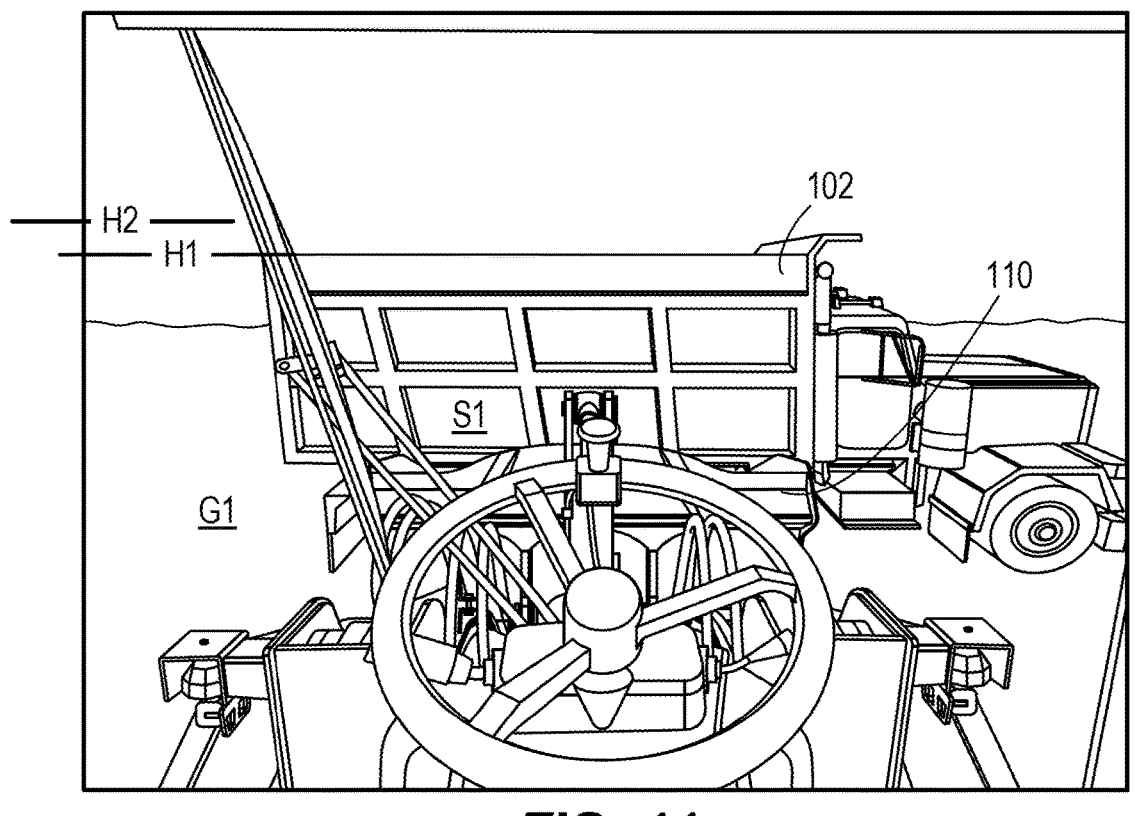
FIG. 11 illustrates the operator station view with the work vehicle in the second position of FIG. 10.
FIG. 12 illustrates the first perception sensor view with the work vehicle in the second position of FIG. 10.
Figure 13:
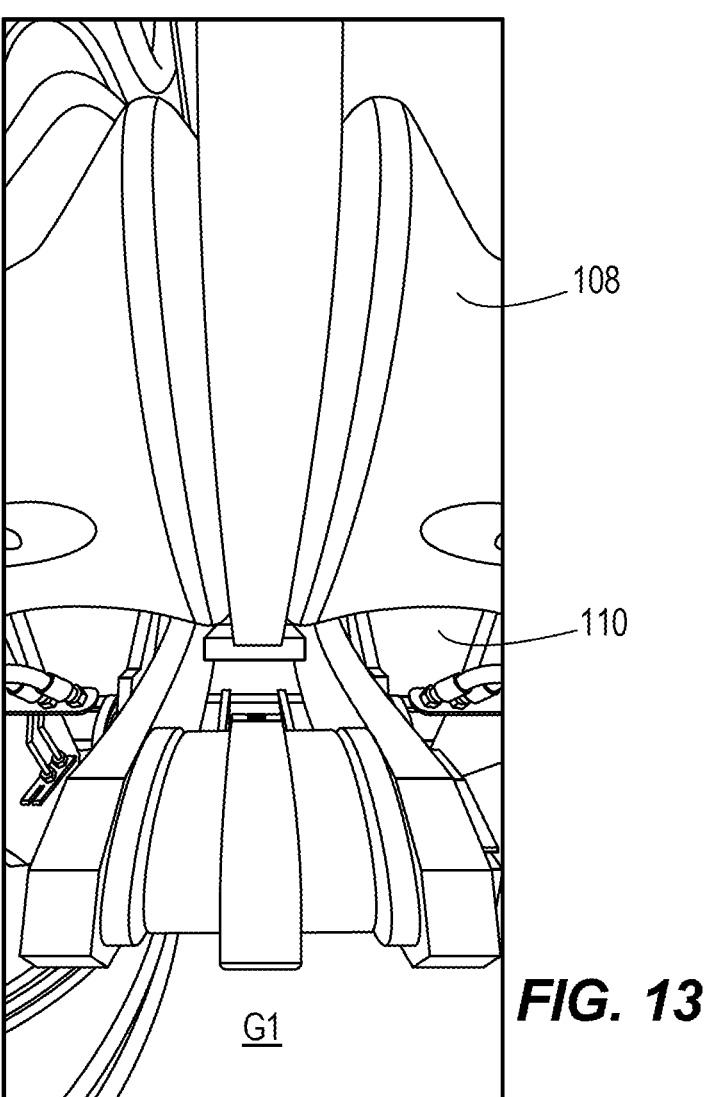
FIG. 13 illustrates the second perception sensor view with the work vehicle in the second position of FIG. 10.
Figure 14:
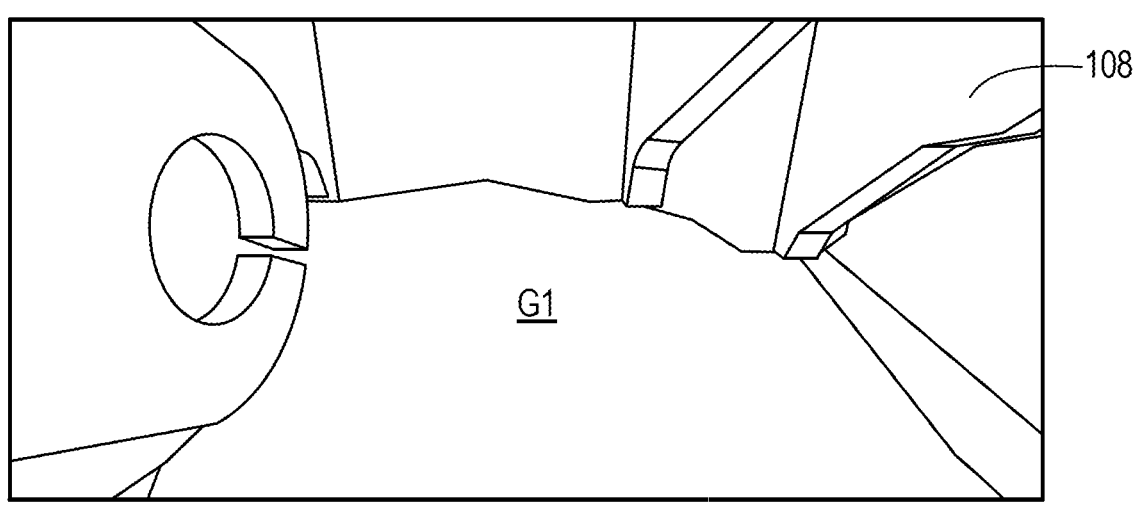
FIG. 14 illustrates the third perception sensor view with the work vehicle in the second position of FIG. 10.
Figure 15:
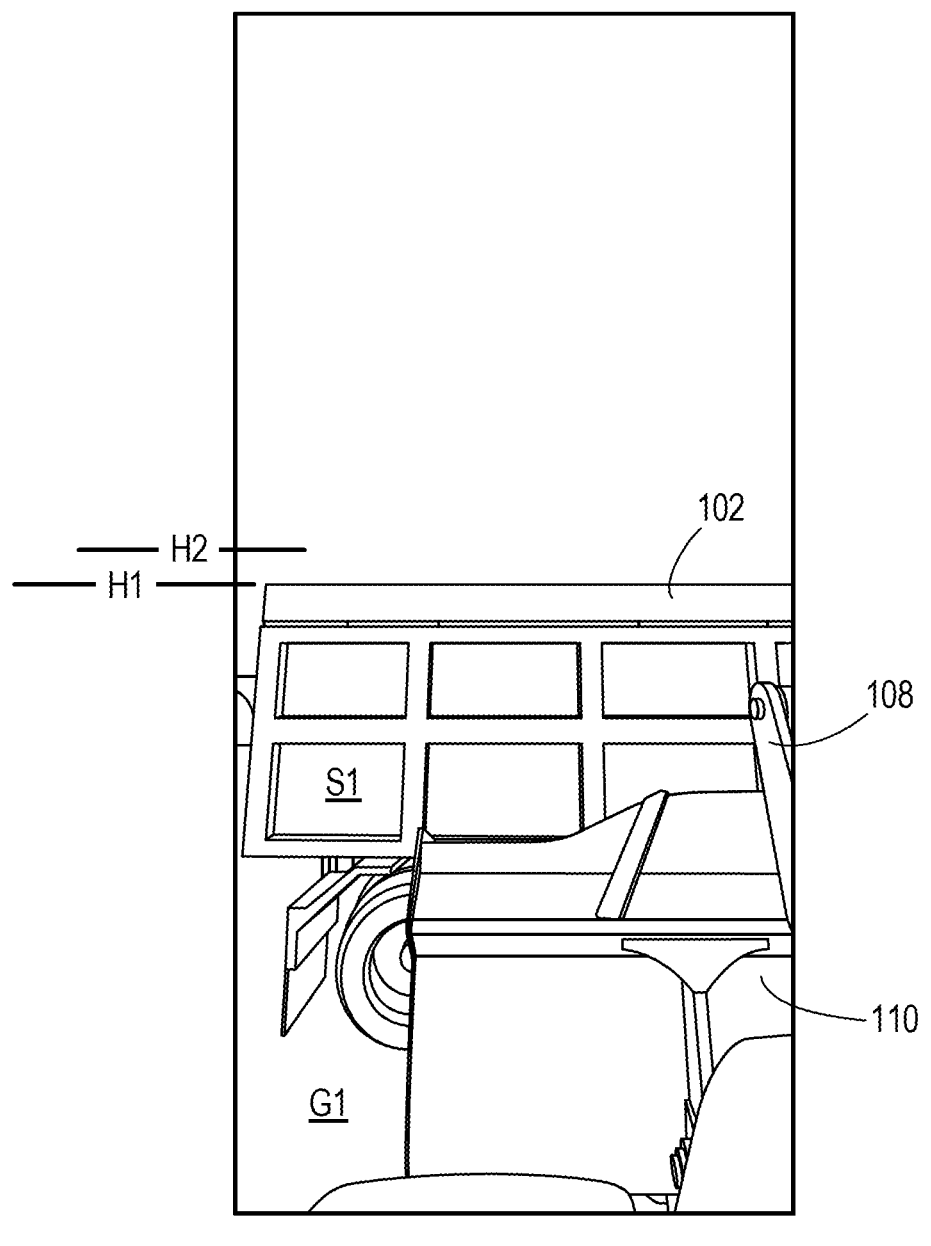
FIG. 15 illustrates the fourth perception sensor view with the work vehicle in the second position of FIG. 10.
Figure 16:
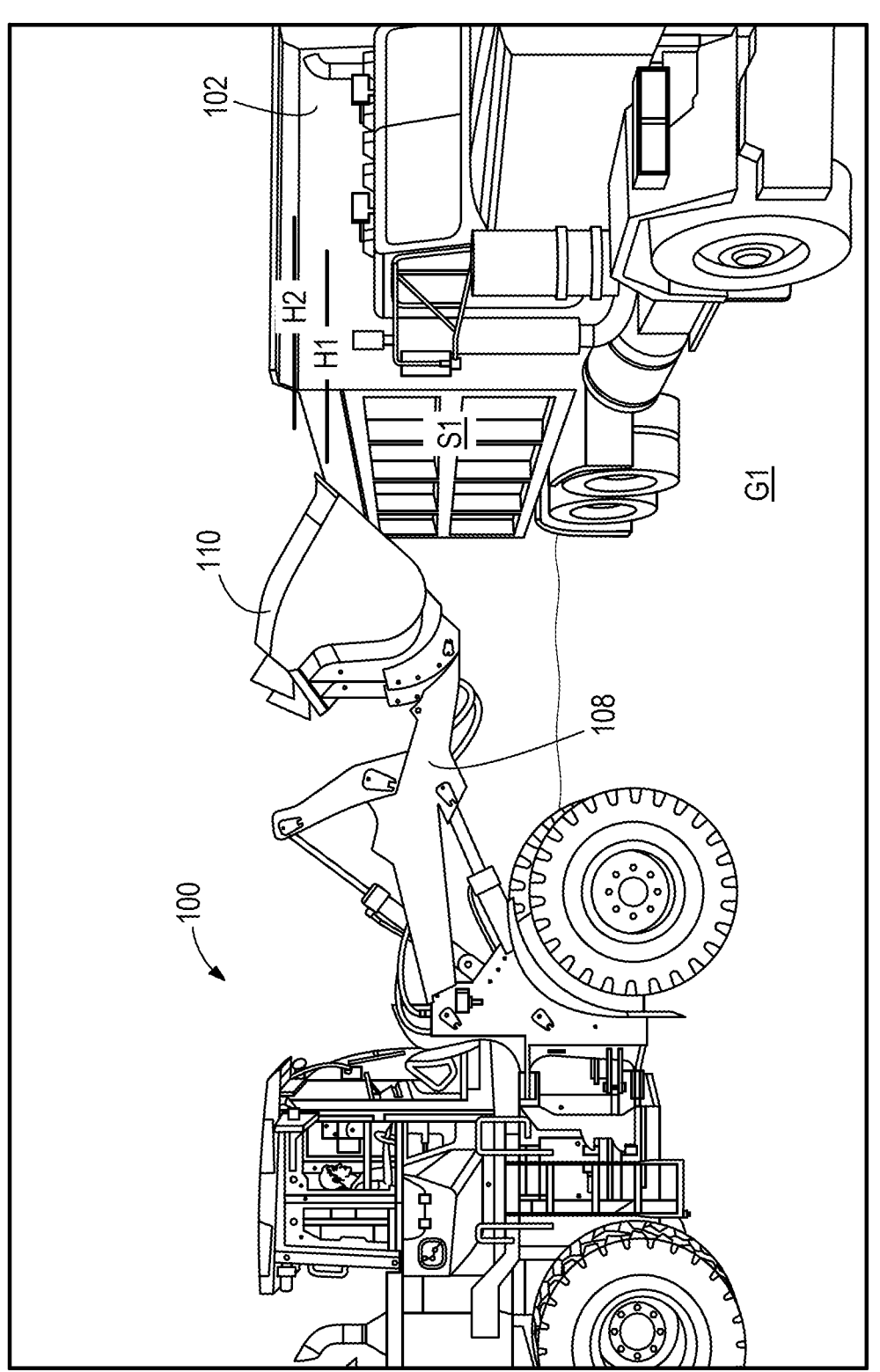
FIG. 16 illustrates a side elevation view of the work vehicle in a third position.
Figure 17:
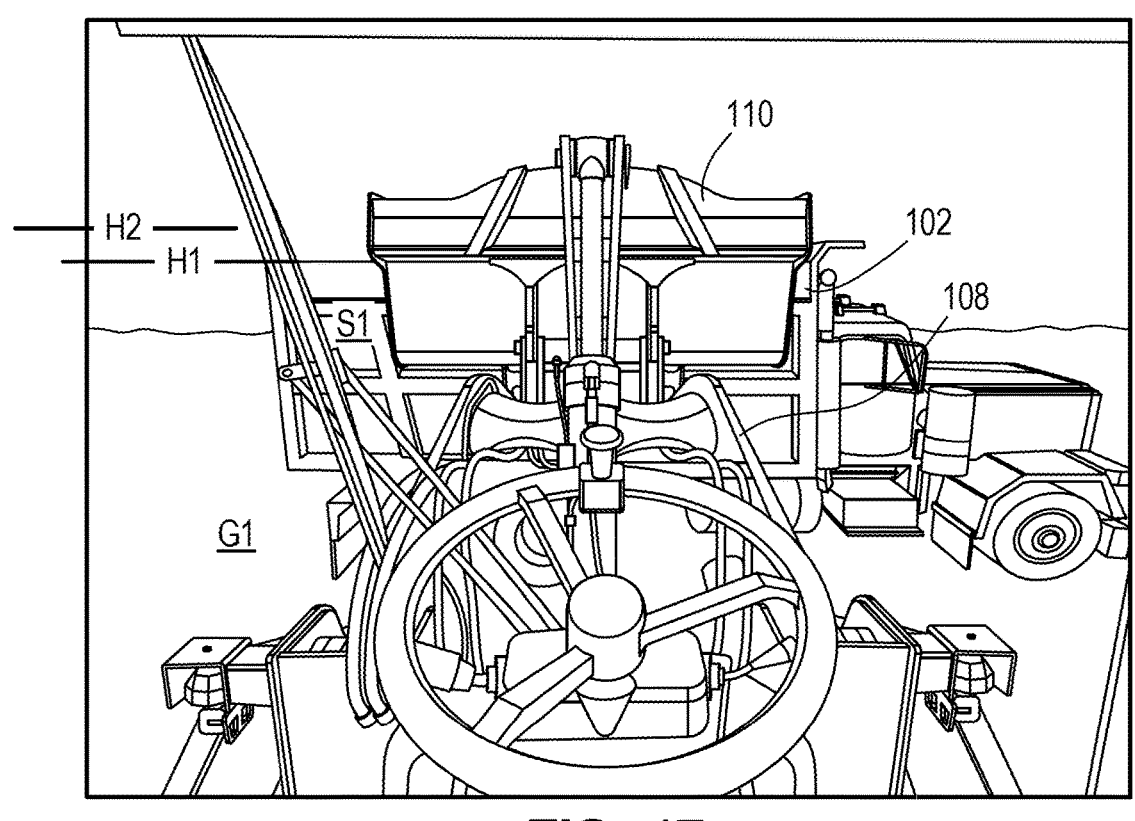
FIG. 17 illustrates the operator station view with the work vehicle in the third position of FIG. 16.
Figure 18:
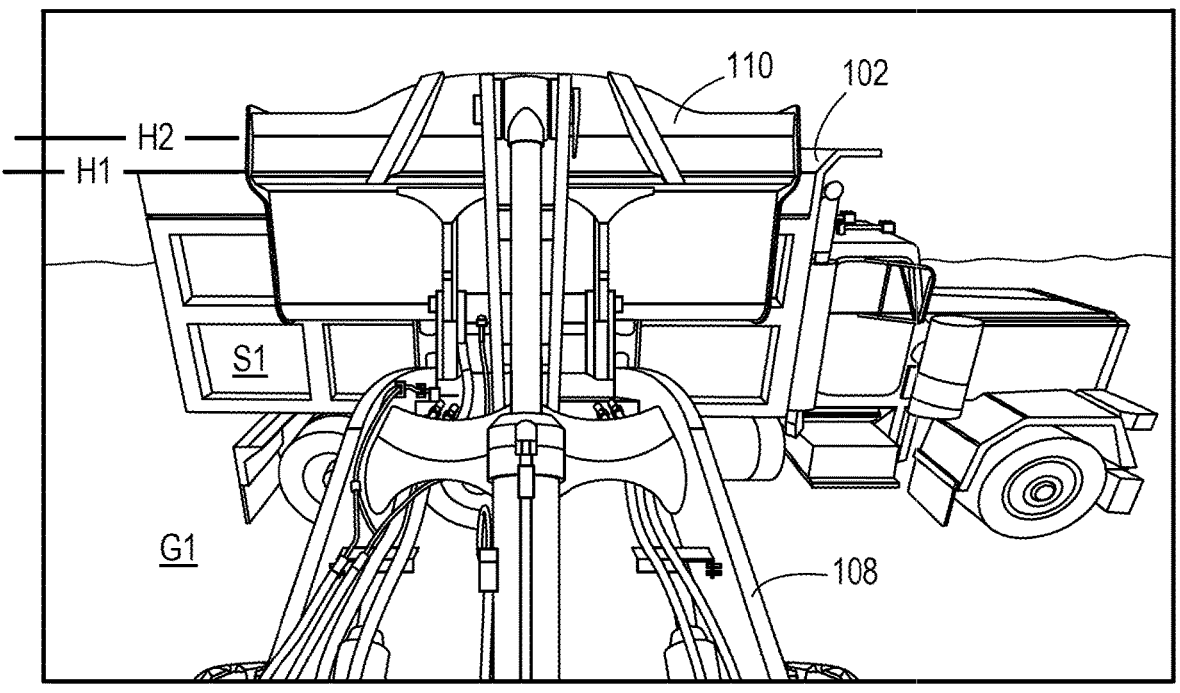
FIG. 18 illustrates the first perception sensor view with the work vehicle in the third position of FIG. 16.
Figure 19:
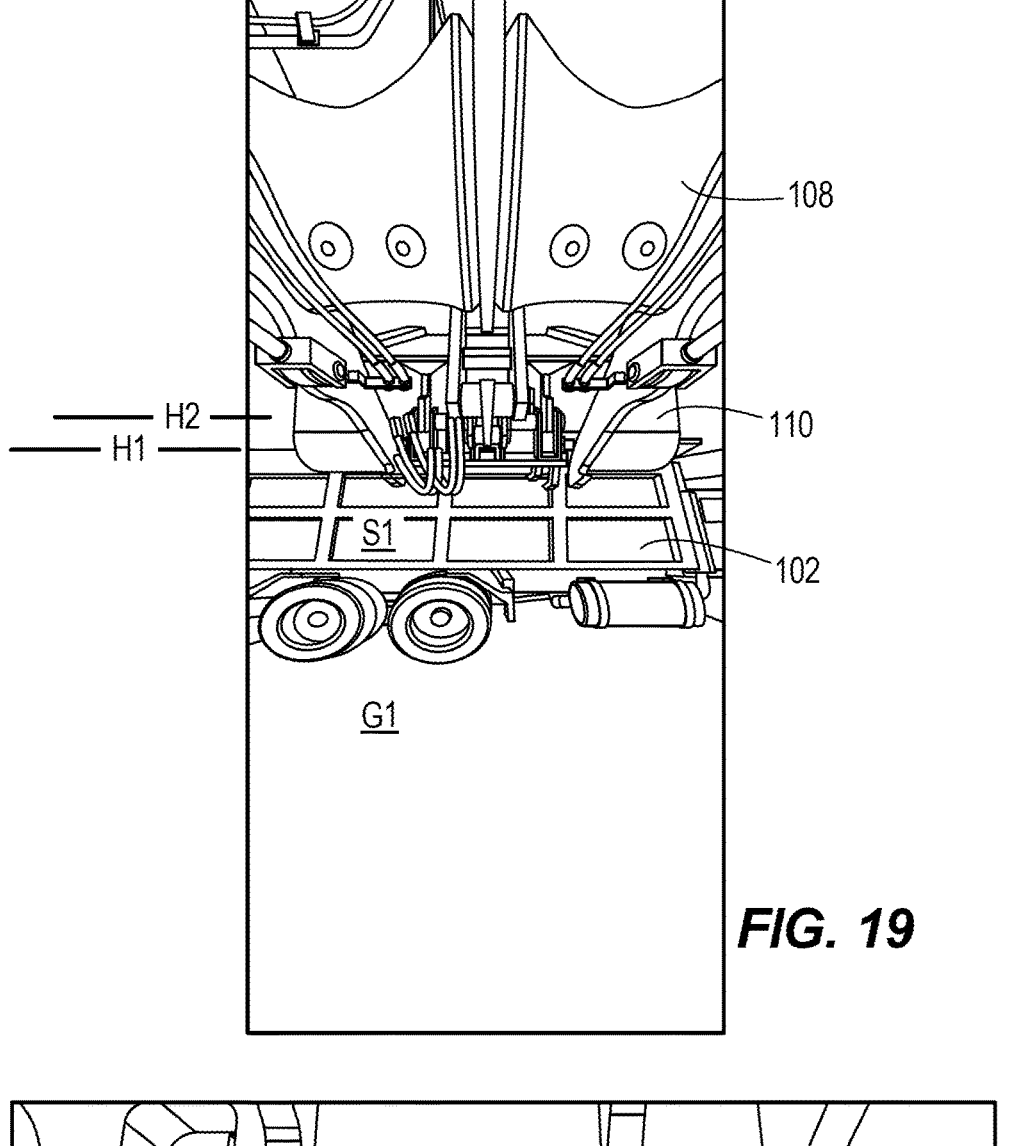
FIG. 19 illustrates the second perception sensor view with the work vehicle in the third position of FIG. 16.
Figure 20:
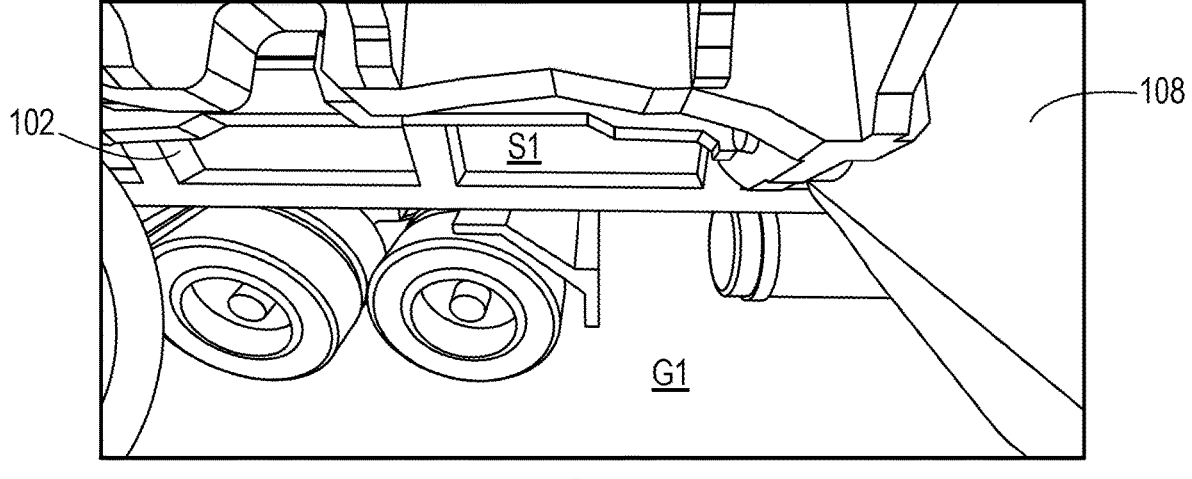
FIG. 20 illustrates the third perception sensor view with the work vehicle in the third position of FIG. 16.
Figure 21:
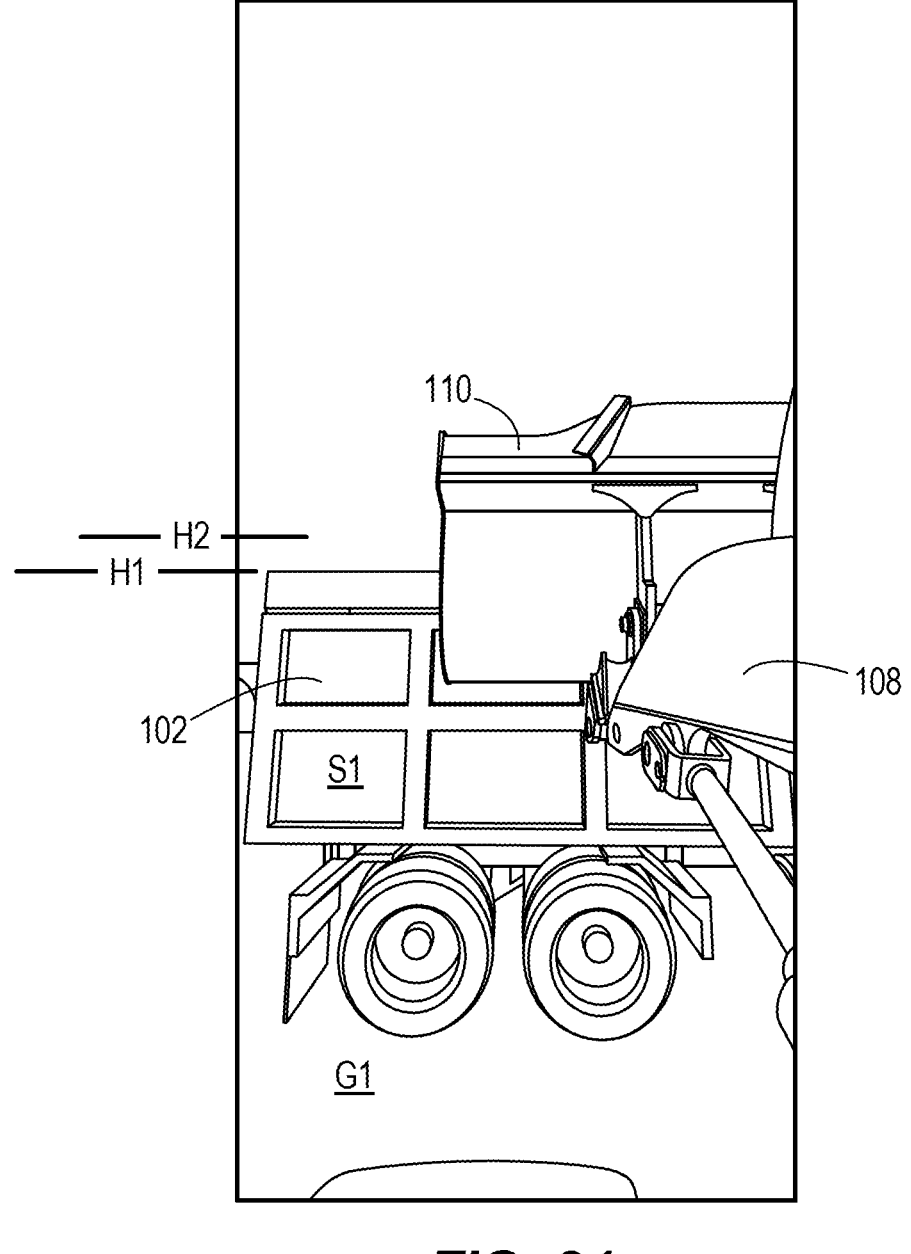
FIG. 21 illustrates the fourth perception sensor view with the work vehicle in the third position of FIG. 16.

The method 300 further includes driving the work vehicle 100 toward the container 102 at a ground speed (at step 302). As shown in FIG. 10, the work vehicle 100 moves closer to the container 102. In some embodiments, the boom 108 may begin to raise and may be higher than before in the second position of the work vehicle 100 shown in FIG. 10. The work vehicle 100 will continue to move closer to the container 102 and the boom 108 will raise more as shown in the positions of the work vehicle 100 shown in succession in FIGS. 16 and 22.

The method 300 also includes determining a distance from the work vehicle 100 to the container 102 with the at least one perception sensor 120 while the work vehicle 100 proceeds toward the container 102 at the ground speed (at step 303). The perception sensor 120 may be placed such that it perceives any of the "views" shown in FIGS. 6-9. Some embodiments include a plurality of perception sensors 120 such that more than one of the "views" of FIGS. 6-9 can be utilized to account for any blind spots formed by, for instance, the boom 108 and/or the implement 110.

The method 300 further includes automatically identifying a side S1 of the container 102 in the approaching environment, including identifying the height H1 of the side S1 of the container 102 and determining the orientation of the side S1 of the container 102 relative to the work vehicle 100 (at step 304).

At step 305, the method 300 includes determining the approach angle of the work vehicle 100 and the estimated arrival location of the work vehicle 100 with regard to the orientation of the side S1 of the container 102.

At step 306, if the work vehicle 100 is approaching the side S1 of the container at an incorrect angle and/or at an incorrect location relative to the container 102, the method 300 includes automatically adjusting the angle of approach of the work vehicle 100 with regard to the orientation of the side S1 of the container 102 and/or activating at least one of the indicators 114 to alert the user. This adjustment to the angle of approach may include, for instance, the controller 142 operating to engage a brake on only one side of the work vehicle 100, to adjust the differential to drive one wheel 136 more than another wheel 136, to adjust the steering of the work vehicle by changing the angle of the front wheels 136, or the like.

The method 300 further includes determining a threshold height H2 for the distal end of the boom 108 such that the implement 110 will clear the side S1 of the container 102 (at step 307). In some embodiments, this step 307 further includes identifying a ground surface G1 in the approaching environment, determining the orientation of the ground surface G1 in relation to the side S1 of the container 102, determining an estimated pitch angle of the work vehicle 100 at the predetermined distance from the container 102 based on the orientation of the ground surface G1, and determining the threshold height H2 based at least in part on the pitch angle due to the orientation of the ground surface G1. These sub-steps function to account for a change in grade of the ground surface G1 that may dip the front end of the work vehicle 100 lower than what would be the case on a perfectly horizontal ground surface G1 or that may raise the front end of the work vehicle 100 higher than what would be the case on a perfectly horizontal ground surface G1.

The method 300 also includes determining a ground speed of the work vehicle 100 with the at least one ground speed sensor 122 (at step 308).

At step 309, the method 300 includes determining the position of the boom 108 and/or the implement 110 with the at least one position sensor 124.

At step 310, the method 300 includes raising the boom 308 (and thereby also raising the implement 110) at a raising speed while the work vehicle 100 travels toward the container 102. In some embodiments, this step 310 includes receiving a user command via the controls 112 to raise the boom 308. In other embodiments, this step 310 includes automatically raising the boom 308 as part of the container load operation without requiring user input to specifically raise the boom 308.

If the distal end of the boom 108 will not reach the threshold height H2 by the time the work vehicle 100 reaches the predetermined distance from the container 102 (e.g., adjacent the container) at the current ground speed (as shown in FIG. 22), the method 300 also includes activating one or more indicators 114 to alert the operator and/or automatically adjusting one or both of the raising speed of the boom 108 and the ground speed of the work vehicle 100

(at step 311). In some embodiments, the controller 142 decreases the speed of the engine 134 in order to slow the ground speed of the work vehicle 100. In some embodiments, the controller 142 applies a brake in order to slow the ground speed of the work vehicle 100. In embodiments utilizing the brake, the controller 142 may further increase the speed of the engine 134 while simultaneously applying the brake in order to increase the raising speed of the boom 108 without increasing the ground speed of the work vehicle 100. Some embodiments of the work vehicle 100 may utilize the parallel drivetrain 138 discussed herein. In such embodiments, the controller 142 may change a power flow in the parallel drivetrain 138 to increase the raising speed of the boom 108 while simultaneously decreasing the ground speed of the work vehicle 100. In some embodiments, the work vehicle 100 may utilize one or more accumulators 132 as part of the hydraulic system discussed herein. In such embodiments, the controller 142 may operate one or more accumulators 132 to supply additional hydraulic pressure to the hydraulic cylinder(s) 126 in order to increase the raising speed of the boom 108.

Once the work vehicle 100 has reached the predetermined distance from the container 102, the method 300 further includes moving the implement 110 such that the material carried by the implement 110 is dropped into the container 102 (at step 312) as shown in FIG. 28. In embodiments including an implement 110 in the form of a bucket, this step 312 includes moving the bucket 110 to a dump position relative to the boom 108 in order to dump the contents of the bucket 110 into the container 102. This step 312 may be performed by the user with the controller 142 receiving a user command via the controls 112 to move the bucket 110 to the dump position, or the step 312 may be performed automatically by the controller 142.

Once the material carried by the implement 110 is loaded into the container 102, the method 300 further includes moving the implement 110 such that the implement 110 will clear the side S1 of the container 102 once more (at step 313) as shown in FIG. 34. In embodiments including the bucket 110, this step 313 includes moving the bucket 110 to a dig position relative to the boom 108. This step may be performed by the user with the controller 142 receiving a user command via the controls 112 to move the bucket 110 to a dig position, or the step 313 may be performed automatically by the controller 142.

The method 300 also includes driving the work vehicle 100 away from the container 102 after loading the container 102 (at step 314). This step 314 may be performed by the user with the controller 142 receiving a user command via the controls 112 to reverse the work vehicle 100, or the step 314 may be performed automatically by the controller 142. In some embodiments, this step 314 is performed semi-automatically, in that the user commands the reverse operation, but the controller 142 governs the speed at which the work vehicle 100 reverses regardless of how fast the user attempts to reverse the work vehicle 100.

As mentioned herein, the position of the boom 108 and/or implement 110 is monitored and the ground speed of the work vehicle 100 is monitored. If the implement 110 does not move at a fast enough implement 110 movement speed to clear the side S1 of the container 102 at the given ground speed, the method 300 also includes activating one or more indicators 114 to alert the operator and/or automatically adjusting the ground speed of the work vehicle 100, the implement 110 movement speed, and/or the boom 108 raising speed (at step 315). In some embodiments, this step 315 includes inhibiting travel of the work vehicle 100 until the implement 110 is in a position to clear the container 102. In other embodiments, this step 315 includes slowing the travel of the work vehicle 100, accelerating the implement 110 movement speed, accelerating the boom 108 raising speed, some combination thereof, or the like. In some embodiments, the adjustment of the boom 108 and/or implement 110 is instead semi-automatic including an initial command from the user via the controls 112 to begin the movement and the controller 142 controlling the speed of the movement of the boom 108 and/or implement 110. In some embodiments, an "all clear" indicator 114 is activated once the implement 110 is clear of the container 102, so the user may know when to begin reversing the work implement 100 or when it is safe to increase the reverse speed of the work implement 100.

The method 300 may further include, at step 316, returning the boom 108 to a lowered position. This step 316 may be performed automatically by the controller 142, or this step 316 may be performed semi-automatically with the user inputting an initial command to lower the boom 108 and the controller 142 controlling the speed of the boom 108 lowering operation and the location of the lowered position regardless of the degree of actuation of the corresponding user control of the controls 112.

The system 200, including the work vehicle 100, is also configured to operate according to a method 400 shown in FIGS. 40A and 40B. The method 400 begins with the controller 142 receiving a user command via the controls 112 to drive the work vehicle 100 toward a container 102 (e.g., a truck, a hopper, a platform, or the like) (at step 401). This step 401 may include only driving toward the container 102, but other embodiments may additionally or alternatively include engaging a dedicated "begin container load operation" button or the like.

The method 400 further includes driving the work vehicle 100 toward the container 102 (at step 402).

The method 400 also includes determining a distance from the work vehicle 100 to the container 102 with the at least one perception sensor 120 while the work vehicle 100 proceeds toward the container 102 (at step 403). Some embodiments include a plurality of perception sensors 120.

The method 400 further includes automatically identifying a side S1 of the container 102 in the approaching environment, including identifying the height H1 of the side S1 of the container 102 and determining the orientation of the side S1 of the container 102 relative to the work vehicle 100 (at step 404).

At step 405, the method 400 includes determining the approach angle of the work vehicle 100 and the estimated arrival location of the work vehicle 100 with regard to the orientation of the side S1 of the container 102.

At step 406, if the work vehicle 100 is approaching the side S1 of the container at an incorrect angle and/or at an incorrect location relative to the container 102, the method 400 includes automatically adjusting the angle of approach of the work vehicle 100 with regard to the orientation of the side S1 of the container 102 and/or activating at least one of the indicators 114 to alert the user. This adjustment to the angle of approach may include, for instance, the controller 142 operating to engage a brake on only one side of the work vehicle 100, to adjust the differential to drive one wheel 136 more than another wheel 136, to adjust the steering of the work vehicle by changing the angle of the front wheels 136, or the like.

The method 400 further includes determining a threshold height H2 for the distal end of the boom 108 such that the implement 110 will clear the side S1 of the container 102 (at step 407). In some embodiments, this step 407 further includes identifying a ground surface G1 in the approaching environment, determining the orientation of the ground surface G1 in relation to the side S1 of the container 102, determining an estimated pitch angle of the work vehicle 100 at the predetermined distance from the container 102 based on the orientation of the ground surface G1, and determining the threshold height H2 based at least in part on the pitch angle due to the orientation of the ground surface G1. These sub-steps function to account for a change in grade of the ground surface G1 that may dip the front end of the work vehicle 100 lower than what would be the case on a perfectly horizontal ground surface G1 or that may raise the front end of the work vehicle 100 higher than what would be the case on a perfectly horizontal ground surface G1.

The method 400 also includes determining a ground speed of the work vehicle 100 with the at least one ground speed sensor 122 (at step 408).

At step 409, the method 400 includes determining the position of the boom 108 and/or the implement 110 with the at least one position sensor 124.

At step 410, the method 400 includes determining a boom raising start distance between the work vehicle 100 and the container 102. This determination can be made, for instance, while the work vehicle 100 approaches the container 102. This boom raising start distance is a distance between the work vehicle 100 and the container 102 that provides enough time for the boom 108 to raise to the threshold height H2. In this manner, the boom 108 and/or implement 110 will not impact the side S1 of the container 102, but the work vehicle 100 will also not drive with the boom 108 raised for any longer than is necessary. In some embodiments, the speed of raising the boom 108 may be adjusted automatically or manually while raising, but other embodiments may raise the boom 108 at a default speed that is related to the ground speed of the vehicle 100 regardless of user input or in the absence of user input.

Once the boom raising start distance has been determined (at step 410), the system 200 can perform a variety of functions. As such, each of FIGS. 40B, 40C, and 40D represent alternative embodiments of continuations of the method 400 after step 410.

With reference to FIG. 40B, the method 400 may continue from step 410 by receiving a user command via the controls 112 to raise the boom 108 (at step 411).

The method 400 further includes activating at least one of the indicators 114 if the user command to raise the boom 108 occurs prior to the work vehicle 100 reaching the boom raising starting distance from the container 102 (at step 412). This feature allows for the user to be alerted if he or she attempts to raise the boom 108 too early in the approach to the container 102. Raising the boom 108 too early results in the work vehicle 100 driving with the boom 108 raised for a longer than necessary distance, which can be a danger to the driver and/or nearby workers.

Other embodiments may additionally or alternatively include delaying raising the boom 108 in response to the command until after the work vehicle 100 has reached the boom raising start distance from the container 102. This delay may require the user to continue inputting a command via the controls 112 to raise the boom 108 until the boom raising start distance has been reached. Other embodiments may log the initial command to raise the boom 108 and act upon the initial command after reaching the boom raising start distance from the container 102 regardless of whether the user continues the initial command or inputs further commands to raise the boom 108. Some embodiments may operate to raise the boom 108 only while the user is actively commanding via the controls 112 that the boom 108 be raised, but also only raise the boom 108 after the boom raising start distance is reached. In still other embodiments, the system 200 ignores any commands to raise the boom 108 that occur before the work vehicle 100 has reached the boom raising start distance from the container 102. Such embodiments may require one or more additional commands to raise the boom 108 via the controls 112 occurring after the boom raising start distance has been reached.

Some embodiments may be beneficial if they provide more feedback to the user than simply activating one or more of the indicators 114 upon receiving a premature command to raise the boom 108. An example of additional feedback to the user for such embodiments may include starting to raise the boom 108 prematurely, but doing so at a relatively slow speed. This slow speed would only be fast enough for the user to visually recognize that the command worked, so as to avoid confusion for a new operator, for instance. In this manner, the operator does not believe the system 200 is broken due to a lack of response to commands. These embodiments may further include increasing the speed of raising the boom 108 once the boom raising start distance has been reached.

In some embodiments, the boom raising start distance determination (at step 410) is initialized only after the user command to raise the boom 108 is received (at step 411).

Turning now to FIG. 40C, an alternative continuation of the method 400 is shown. The method 400 may continue from step 410 by activating one of the indicators 114 once the work vehicle 100 has reached the boom raising start distance from the container 102 (at step 413). In this manner, the user may be made aware of the start of the window of time during which it would be appropriate to begin commanding the boom 108 to raise.

The method 400 further includes determining a second boom raising start distance from the container 102 (at step 414). In such embodiments, the first boom raising start distance is the beginning of the window of time during which it would be appropriate to begin commanding the boom 108 to raise, and the second boom raising start distance is a shorter distance than the first boom raising start distance. The second boom raising start distance is longer than the minimum distance required for the boom 108 to raise, but other embodiments may include the second boom raising start distance being equal to the minimum distance required.

At step 415, the method 400 includes activating another of the indicators 114 after the work vehicle 100 has reached the second boom raising start distance from the container 102. Some embodiments may additionally or alternatively include automatically raising the boom 108 after the work vehicle 100 has reached the second boom raising start distance. In embodiments that only activate another of the indicators 114 after the work vehicle 100 has reached the second boom raising start distance, the method 400 may further include determining a minimum boom raising start distance required to raise the boom 108 in time. In such embodiments, if the work vehicle 100 has passed the minimum boom raising start distance and the user still has not commanded the boom 108 to raise, the system 200 may automatically slow or stop the work vehicle 100.

With reference to FIG. 40D, another alternative continuation of the method 400 is shown. The method 400 may continue from step 410 by automatically raising the boom

108 after the work vehicle 100 reaches the boom raising start distance from the container 102 (at step 416).

In some embodiments, the method 400 also includes receiving a user command via the controls 112 to alter one of the ground speed of the work vehicle 100 and the raising speed of the boom 108 (at step 417).

Upon receiving the user command at step 417, the system 200 may further automatically adjust the other of the ground speed of the work vehicle 100 and the raising speed of the boom 108 such that the boom 108 reaches the threshold height H2 in time without being raised at the threshold height H2 for an unnecessary amount of time (at step 418).

In some embodiments, in response to the user slowing or stopping the work vehicle 100, the system 200 further automatically stops raising the boom 108. Such embodiments may further determine a boom raising resume distance between the work vehicle 100 and the container 102. Still other embodiments may automatically lower the boom 108 in response to a user command via the controls 112 to stop the work vehicle 100.

In other embodiments, in response to the user stopping or lowering the boom 108, the system 200 automatically stops or slows the work vehicle 100.

The remainder of the method 400, regardless of embodiment, may further continue with the unloading process described above with regard to the method 300.

Of course, features of one embodiment can be combined with features of another embodiment to create yet another embodiment. As such, the present disclosure is capable of many alterations and embodiments, and the specific disclosed embodiments should not be viewed as limiting.

Thus, embodiments described herein provide a work vehicle and methods and systems for operating a work vehicle.

What is claimed is:

1. A system for operating a work vehicle to load a container, the system comprising:

a work vehicle including
   a frame,
   a boom having a proximal end coupled to the frame and a distal end opposite the proximal end,
   an implement coupled to the distal end of the boom,
   at least one perception sensor configured to sense an approaching environment during travel of the work vehicle, and
   at least one ground speed sensor configured to sense a condition related to a ground speed of the work vehicle;

a user interface including
   controls configured to command at least some operations of the work vehicle, and
   indicators configured to indicate at least one status related to the work vehicle; and a controller operatively coupled to the controls, the indicators, the at least one perception sensor, and the at least one ground speed sensor, the controller configured to
   receive a user command via the controls to move the work vehicle toward the container,
   output a control signal to drive the work vehicle toward the container,
   determine a distance between the work vehicle and the container,
   determine the ground speed of the work vehicle,
   calculate a boom raising start distance between the work vehicle and the container based on sensor data from the at least one perception sensor and the at least one ground speed sensor, and after the work vehicle has reached the boom raising start distance from the container, and while the work vehicle travels toward the container, automatically output a control signal to raise the boom.

2. The system of claim 1, wherein the controller is further configured to receive a user command via the controls to alter the ground speed of the work vehicle, and if the user command to alter the ground speed of the work vehicle includes decreasing the ground speed of the work vehicle, automatically output a control signal to stop raising the boom.

3. The system of claim 2, wherein the controller is further configured to after decreasing the ground speed of the work vehicle, determine a boom raising resume distance between the work vehicle and the container, and automatically output a control signal to resume raising the boom after the work vehicle reaches the boom raising resume distance between the work vehicle and the container.

4. The system of claim 2, wherein the controller is further configured to receive a user command via the controls to stop the work vehicle before reaching a predetermined distance from the container, and after receiving the user command to stop the work vehicle, automatically output a control signal to lower the boom.

5. The system of claim 1, wherein the controller is further configured to receive a user command via the controls to alter a raising speed of the boom, and if the user command to alter the raising speed of the boom includes increasing the raising speed of the boom, automatically output a control signal to increase the ground speed of the work vehicle.

6. The system of claim 1, wherein the controller is further configured to receive a user command via the controls to alter a raising speed of the boom, and if the user command to alter the raising speed of the boom includes decreasing the raising speed of the boom, automatically output a control signal to decrease the ground speed of the work vehicle.

7. The system of claim 1, wherein the controller is further configured to determine the boom raising start distance as the work vehicle approaches the container.

8. A system for operating a work vehicle to load a container, the system comprising:

a work vehicle including a boom having a proximal end coupled to the frame and a distal end opposite the proximal end, an implement coupled to the distal end of the boom, at least one perception sensor configured to sense an approaching environment during travel of the work vehicle, and at least one ground speed sensor configured to sense a condition related to a ground speed of the work vehicle;

a user interface including controls configured to command at least some operations of the work vehicle, and indicators configured to indicate at least one status related to the work vehicle; and a controller operatively coupled to the controls, the indicators, the at least one perception sensor, and the at least one ground speed sensor, the controller configured to receive a user command via the controls to move the work vehicle toward the container, output a control signal to drive the work vehicle toward the container, determine a distance between the work vehicle and the container, determine the ground speed of the work vehicle, calculate a boom raising start distance between the work vehicle and the container based on sensor data from the at least one perception sensor and the at least one ground speed sensor, receive a user command via the controls to alter the ground speed of the work vehicle, and if the user command to alter the ground speed of the work vehicle includes increasing the ground speed of the work vehicle, automatically output a control signal to increase a raising speed of the boom.

9. A system for operating a work vehicle to load a container, the system comprising:

a work vehicle including a boom having a proximal end coupled to the frame and a distal end opposite the proximal end, an implement coupled to the distal end of the boom, at least one perception sensor configured to sense an approaching environment during travel of the work vehicle, and at least one ground speed sensor configured to sense a condition related to a ground speed of the work vehicle;

a user interface including controls configured to command at least some operations of the work vehicle, and indicators configured to indicate at least one status related to the work vehicle; and a controller operatively coupled to the controls, the indicators, the at least one perception sensor, and the at least one ground speed sensor, the controller configured to receive a user command via the controls to move the work vehicle toward the container, output a control signal to drive the work vehicle toward the container, determine a distance between the work vehicle and the container, determine the ground speed of the work vehicle, calculate a boom raising start distance between the work vehicle and the container based on sensor data from the at least one perception sensor and the at least one ground speed sensor, receive a user command via the controls to alter the ground speed of the work vehicle, and if the user command to alter the ground speed of the work vehicle includes decreasing the ground speed of the work vehicle, automatically output a control signal to decrease a raising speed of the boom.

* * * * *